(12) United States Patent
Khatib et al.

(10) Patent No.: US 10,213,925 B2
(45) Date of Patent: Feb. 26, 2019

(54) WORKPIECE CONTACT STATE ESTIMATING DEVICE AND WORKPIECE CONTACT STATE ESTIMATION METHOD

(71) Applicants: THE BOARD OF TRUSTEES OF THE LELAND STANFORD JUNIOR UNIVERSITY, Stanford, CA (US); HONDA MOTOR CO., LTD., Tokyo (JP)

(72) Inventors: Oussama Khatib, Stanford, CA (US); Shuyun Chung, San Jose, CA (US); Norio Neki, Saitama (JP)

(73) Assignees: THE BOARD OF TRUSTEES OF THE LELAND STANFORD JUNIOR UNIVERSITY, Stanford, CA (US); HONDA MOTOR CO., LTD., Tokyo (JP)

( * ) Notice: Subject to any disclaimer, the term of this patent is extended or adjusted under 35 U.S.C. 154(b) by 229 days.

(21) Appl. No.: 15/260,492

(22) Filed: Sep. 9, 2016

(65) Prior Publication Data

US 2018/0071915 A1    Mar. 15, 2018

(51) Int. Cl.
*G06F 19/00* (2018.01)
*B25J 13/00* (2006.01)
*B25J 9/16* (2006.01)
*B25J 9/10* (2006.01)

(52) U.S. Cl.
CPC .............. *B25J 13/00* (2013.01); *B25J 9/10* (2013.01); *B25J 9/1656* (2013.01); *B25J 9/1679* (2013.01); *G05B 2219/39322* (2013.01); *G05B 2219/40032* (2013.01); *Y10S 901/02* (2013.01); *Y10S 901/31* (2013.01); *Y10S 901/46* (2013.01)

(58) Field of Classification Search
CPC ......... G05D 3/00; B25J 9/1692; B25J 13/085; B25J 9/1612; B25J 9/10; B25J 9/1656; B25J 13/00; G05B 2219/39322
See application file for complete search history.

(56) References Cited

U.S. PATENT DOCUMENTS

| | | | |
|---|---|---|---|
| 4,611,843 A * | 9/1986 | Burger | B25J 9/1692 294/103.1 |
| 2008/0312769 A1 | 12/2008 | Sato et al. | |
| 2010/0057256 A1 | 3/2010 | Sato et al. | |
| 2013/0178978 A1* | 7/2013 | Kim | G05D 3/00 700/251 |
| 2013/0197696 A1* | 8/2013 | Nammoto | B25J 9/1612 700/259 |
| 2014/0107843 A1* | 4/2014 | Okazaki | B25J 13/085 700/260 |

\* cited by examiner

*Primary Examiner* — Tuan A Vu
(74) *Attorney, Agent, or Firm* — Rankin, Hill & Clark LLP

(57) ABSTRACT

The present invention provides a workpiece contact state estimating device and a workpiece contact state estimation method to estimate an actual state of contact of a workpiece A with a peripheral object on the basis of a feasible contact acting force range, which is a feasible range of the value of a contact acting force (the force acting on a manipulator 1 generated by contact) prepared in advance for each of a plurality of types of contact states that are feasible as the states of contact of the workpiece A with the peripheral object, and a measurement value of the contact acting force at the time of contact of the workpiece A with the peripheral object.

9 Claims, 10 Drawing Sheets

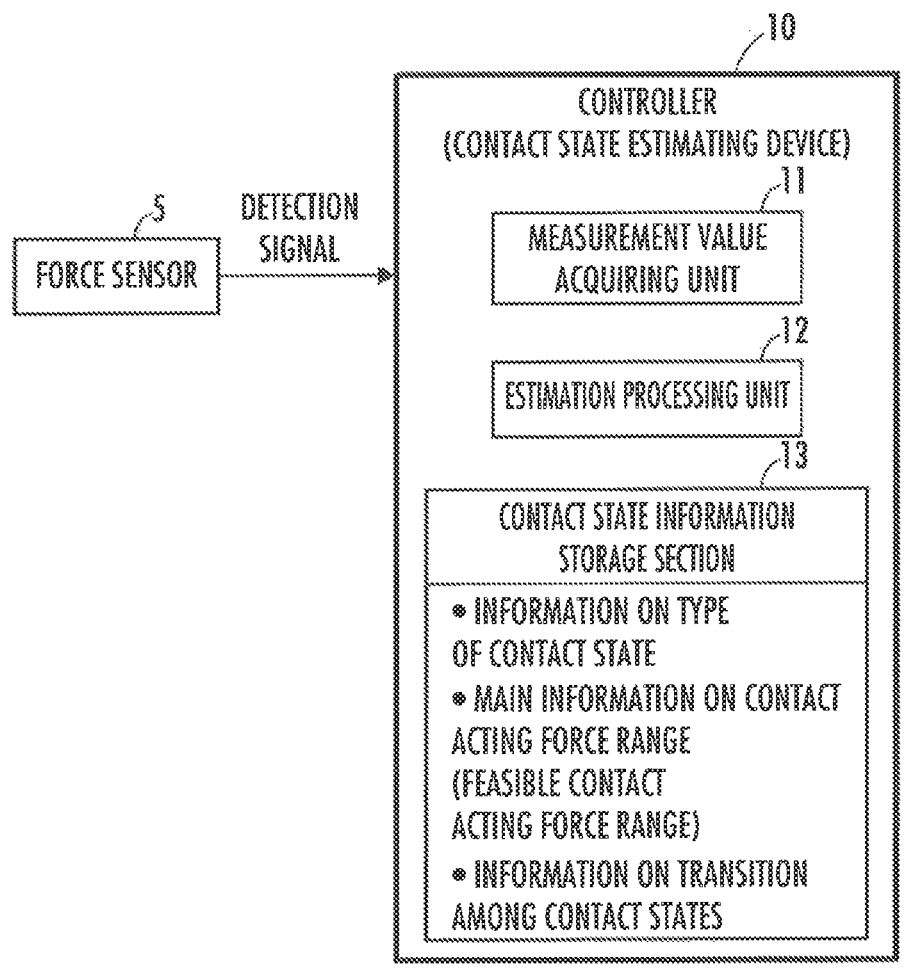

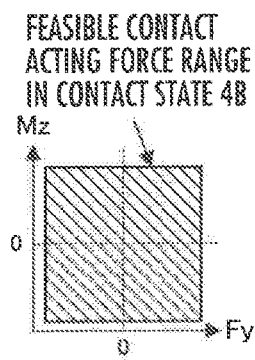

FIG.10A

FEASIBLE CONTACT ACTING FORCE RANGE IN CONTACT STATE 4B

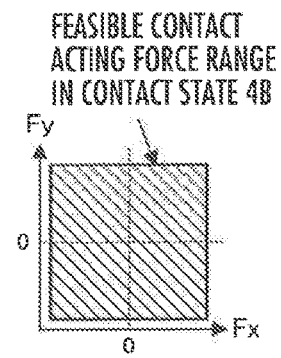

FIG.10B

FEASIBLE CONTACT ACTING FORCE RANGE IN CONTACT STATE 4B

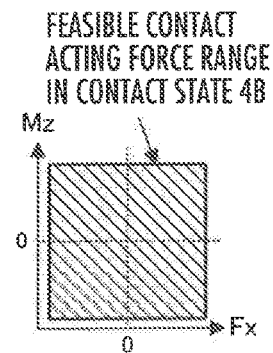

FIG.10C

FEASIBLE CONTACT ACTING FORCE RANGE IN CONTACT STATE 4B

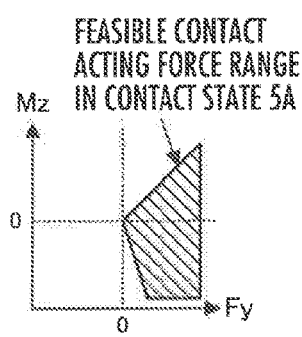

FIG.11A

FEASIBLE CONTACT ACTING FORCE RANGE IN CONTACT STATE 5A

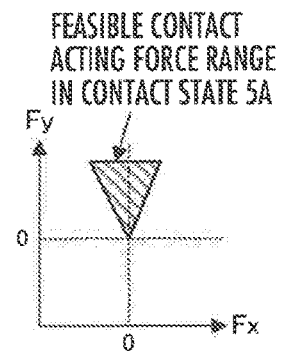

FIG.11B

FEASIBLE CONTACT ACTING FORCE RANGE IN CONTACT STATE 5A

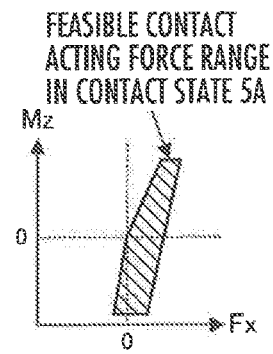

FIG.11C

FEASIBLE CONTACT ACTING FORCE RANGE IN CONTACT STATE 5A

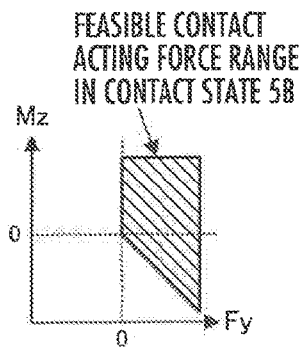

FIG.12A

FEASIBLE CONTACT ACTING FORCE RANGE IN CONTACT STATE 5B

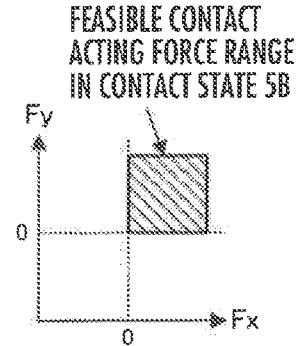

FIG.12B

FEASIBLE CONTACT ACTING FORCE RANGE IN CONTACT STATE 5B

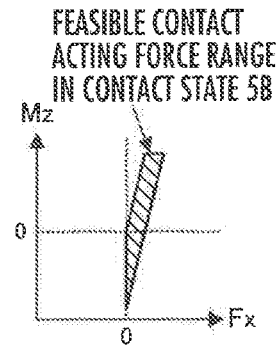

FIG.12C

FEASIBLE CONTACT ACTING FORCE RANGE IN CONTACT STATE 5B

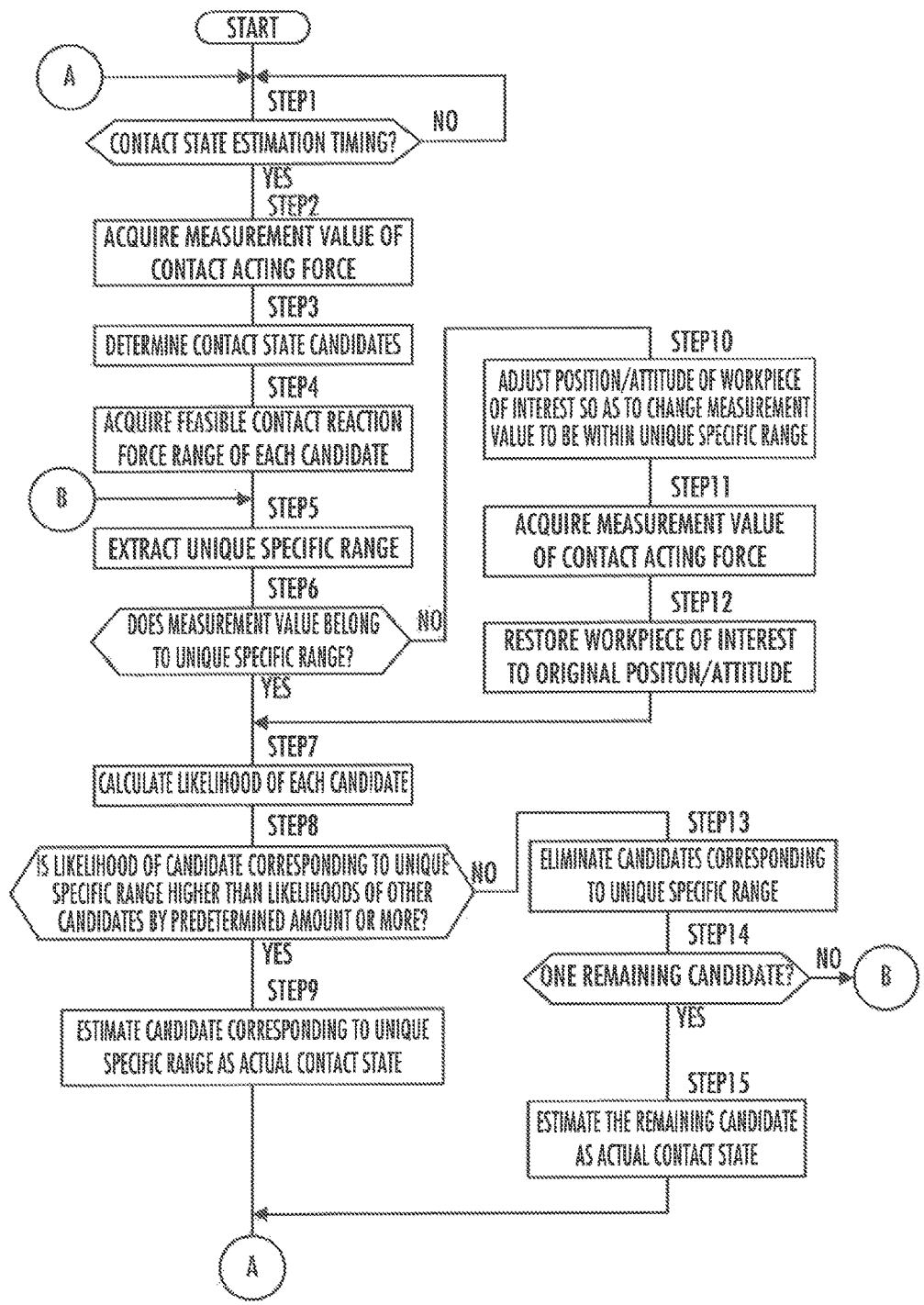

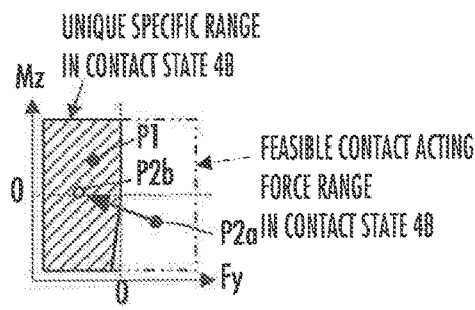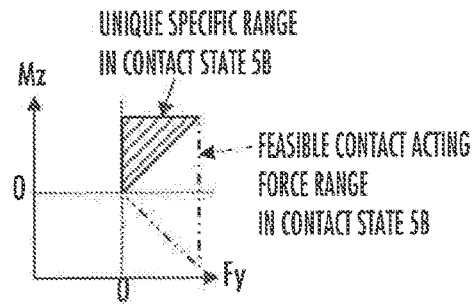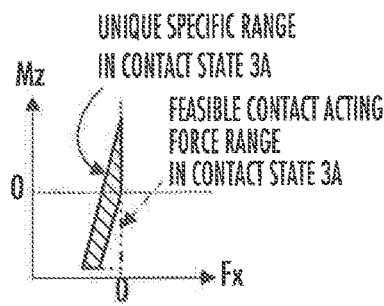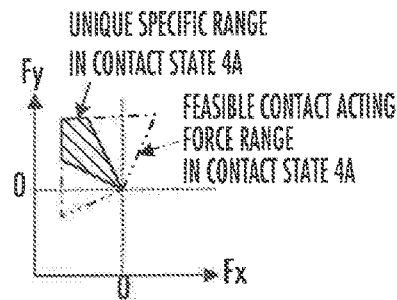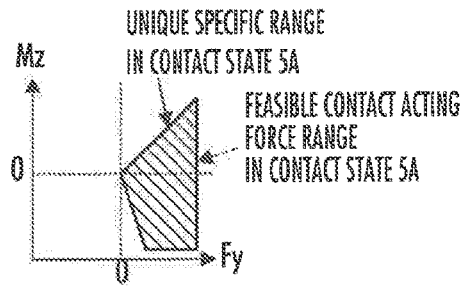

WORKPIECE CONTACT STATE ESTIMATING DEVICE AND WORKPIECE CONTACT STATE ESTIMATION METHOD

BACKGROUND OF THE INVENTION

Field of the Invention

The present invention relates to a device and a method for estimating the state of contact of a workpiece, which is held by the distal end portion of a manipulator, with a peripheral object existing around a desired position in a case of moving the workpiece to the desired position.

Description of the Related Art

Hitherto, as this type of device, the one described in, for example, US2010/0057256 (hereinafter referred to as "Patent Document 1") or US2008/0312769 (hereinafter referred to as "Patent Document 2") has been known. These Patent Documents 1 and 2 describe technologies for fitting a workpiece to be fitted, which is grasped by a distal end of a robot (manipulator), to a hole of a receiving workpiece.

Patent Document 1 describes a technology for correcting the posture of a workpiece to be fitted by performing force control in a state, in which a control point serving as the point of application of a force (translational force and moment) acting on the workpiece to be fitted has been changed, if jamming occurs in the process of entering the workpiece to be fitted into a hole of a receiving workpiece.

Further, Patent Document 2 describes a technology for correcting the posture of a workpiece to be fitted by performing force control on the basis of a maximum value of the detection value of a force (translational force and moment) acting on the workpiece to be fitted or the detection value of the force at the time of a first contact between the workpiece to be fitted and a receiving workpiece.

When performing an operation for moving a workpiece to a predetermined desired position, such as an operation for inserting a workpiece to be fitted into a hole of a receiving workpiece, by a manipulator, a workpiece may come in contact with a peripheral object existing around a desired position typically while the workpiece is being moved to the desired position, thus preventing smooth movement of the workpiece to the desired position.

In this case, the pattern of the state of contact of the workpiece with the peripheral object (i.e. which part of the workpiece comes in contact with which part of the peripheral object, or a positional relationship or an posture relationship in which the workpiece comes in contact with the peripheral object) usually takes a plurality of types of patterns.

For example, in the case where a workpiece to be fitted is fitted into a hole of the receiving workpiece as described in Patent Documents 1 and 2, the pattern of the state of contact with the receiving workpiece during the movement of the workpiece to be fitted may be, for example, a pattern in which a corner of the distal end portion of the workpiece to be fitted comes in contact with a peripheral part of an opening end of the hole of the receiving workpiece, a pattern in which a side surface of the distal end portion of the workpiece to be fitted comes in contact with the opening end of the hole, or a pattern in which a corner of the distal end portion of the workpiece to be fitted comes in contact with a side wall of the hole and a side surface of the distal end portion of the workpiece to be fitted comes in contact with the opening end of the hole.

Further, if the contact between the workpiece and the peripheral object (contact that blocks the movement of the workpiece to a desired position) occurs while the workpiece is being moved, then a correction is desirably made in a manner suited for the pattern of the state of contact of the workpiece with the peripheral object in order to correct the position or the posture of the workpiece so as to enable the workpiece to be properly moved to the desired position.

For example, in the case where the workpiece to be fitted is fitted into the hole of the receiving workpiece, if a corner of the distal end portion of the workpiece to be fitted comes in contact with the peripheral part of the opening end of the receiving workpiece, then it is necessary to slide the workpiece to be fitted to the hole side and then move the workpiece to be fitted toward the hole.

Meanwhile, if a side surface of the distal end portion of the workpiece to be fitted is in contact with the opening end of the hole or a corner of the distal end portion of the workpiece to be fitted is in contact with a side wall of the hole and also the side surface of the distal end portion of the workpiece to be fitted is in contact with the opening end of the hole, then it is necessary to correct the posture of the workpiece to be fitted so as to align the axial direction of the workpiece to be fitted with the axial direction of the hole.

Thus, in the case where the workpiece to be fitted comes in contact with the peripheral object while the workpiece to be fitted is being moved, the position or the posture of the workpiece is desirably corrected in a manner suited to the pattern of the contact state. For this purpose, it is desired that the pattern of the state of contact of the workpiece with the peripheral object can be identified.

However, the prior arts described in the foregoing Patent Documents 1 and 2 are adapted to correct the posture of a workpiece by a force control technique rather than identifying the pattern of the contact between a workpiece and a peripheral object.

More specifically, according to the techniques described in the foregoing Patent Documents 1 and 2, in the state in which the contact between a workpiece to be fitted and a receiving workpiece causes a force to be applied to the workpiece to be fitted, the posture of the workpiece to be fitted is corrected by performing force control on the assumption that at least the distal end portion of the workpiece to be fitted has entered a hole of the receiving workpiece.

Hence, if a corner of the distal end portion of the workpiece to be fitted comes in contact with the peripheral part of the opening end of the receiving workpiece, meaning that the distal end portion of the workpiece to be fitted has not yet entered the hole, then the position of the workpiece to be fitted cannot be properly corrected, thus possibly preventing the workpiece to be fitted from entering the hole.

Further, even when the distal end portion of the workpiece to be fitted enters the hole to a certain extent, the gain of the force control or a desired value of the force may become inappropriate, depending on the pattern of the state of contact between the workpiece to be fitted and the receiving workpiece, and the posture of the workpiece to be fitted may not be ideally corrected.

SUMMARY OF THE INVENTION

The present invention has been made in view of the background described above, and an object of the invention is to provide a device and a method which make it possible to properly estimate the pattern of the state of contact of a workpiece with a peripheral object when the workpiece being moved to a desired position by a manipulator comes in contact with the peripheral object.

To this end, a workpiece contact state estimating device according to the present invention is a device adapted to estimate, at a time of performing an operation for moving a workpiece held by a distal end portion of a manipulator to a desired position by the manipulator, a state of contact of the workpiece with a peripheral object, which is an object existing in a periphery of the desired position, including:

a measurement value acquiring unit that acquires a measurement value of a contact acting force, which is a force acting on the manipulator according to a contact reaction force applied to the workpiece from the peripheral object at a time of contact of the workpiece with the peripheral object; and an estimation processing unit that estimates, as an actual state of contact of the workpiece with the peripheral object, one of a plurality of types of contact states based on a feasible contact acting force range, which is a feasible range of the value of the contact acting force prepared in advance for each of the plurality of types of contact states established in advance as feasible states of contact of the workpiece with the peripheral object, and the measurement value of the contact acting force (a first aspect of the invention).

The term "contact acting force" means one or both of a translational force and moment. In this case, the term "feasible contact acting force range" is a range in the space of the dimension of the number of components of the contact acting force.

In the first aspect of the invention, the feasible contact acting force range generally depends on the type of a contact state (more specifically, the type of the pattern of the contact state of a workpiece with a peripheral object). Therefore, the estimation processing unit estimates one of a plurality of types of contact states as an actual state of contact of the workpiece with the peripheral object on the basis of a feasible contact acting force range prepared in advance for each of the plurality of types of contact states and a measurement value of the contact acting force. This makes it possible to properly estimate the actual state of contact of the workpiece with the peripheral object.

Thus, according to the first aspect of the invention, if a workpiece comes in contact with a peripheral object while the workpiece is being moved to a desired position by a manipulator, the pattern of the contact state can be properly estimated.

In the first aspect of the invention, the feasible contact acting force range for each of the plurality of types of contact states is preferably a range defined by a relationship between a contact reaction force applied to the workpiece from the peripheral object and the contact acting force in each contact state, and a predetermined constrained condition that defines a range of a value of the feasible contact reaction force in each contact state, the predetermined constrained condition including at least one of a constrained condition related to a force of friction between the peripheral object and the workpiece and a constrained condition related to a direction of a drag acting on the workpiece from the peripheral object (a second aspect of the invention).

The term "contact reaction force" means a component that influences the contact acting force in the translational force and moment applied to the workpiece from the peripheral object at each location of the contact between the workpiece and the peripheral object.

According to the second aspect of the invention, the feasible contact acting force range for each type of contact state can be ideally set by reflecting the frictional force or the mechanical constrained condition related to the direction of the drag.

As the constrained condition related to the frictional force, a constrained condition in which, for example, the frictional force does not exceed a maximum static frictional force may be adopted. Further, as the constrained condition related to the direction of the drag, a constrained condition in which, for example, the direction of the drag does not become a direction that causes a workpiece to enter a peripheral object may be adopted.

In the first aspect of the invention or the second aspect of the invention, the estimation processing unit may be configured to include a first determining unit that determines whether or not a measurement value of the contact acting force is a value that belongs only to the feasible contact acting force range corresponding to one contact state among the plurality of types of contact states, and to determine whether or not the one contact state is the actual contact state in a case where a determination result of the first determining unit is affirmative (a third aspect of the invention).

If the determination of the first determining unit is affirmative, then the measurement value of the contact acting force is a value that belongs to the feasible contact acting force range corresponding to one contact state among the plurality of types of contact states, whereas the measurement value is a value that does not belong to feasible contact acting force ranges corresponding to contact states other than the one contact state.

In this case, therefore, the actual state of contact of the workpiece with the peripheral object is very likely to be the foregoing one contact state.

Hence, in the third aspect of the invention, if the determination result of the first determining unit is affirmative, the estimation processing unit determines whether the one contact state is the actual contact state. This makes it possible to efficiently estimate an actual contact state from among the plurality of types of contact states.

As an exemplary mode of the third aspect of the invention, a mode may be adopted, in which the one contact state is estimated as the actual contact state if the determination result of the first determining unit is affirmative.

However, if the measurement value of the contact acting force, in particular is a value relatively close to the boundary of the feasible contact reaction force corresponding to any one of the contact states other than the foregoing one contact state, then the determination result of the first determining unit may become affirmative even when the actual contact state is a contact state other than the foregoing one contact state due to mainly an error of the workpiece movement control by the manipulator or an error in the position or the posture of the workpiece with respect to the distal end portion of the manipulator.

Hence, in the third aspect of the invention, the estimation processing unit is preferably configured to further include an evaluation index value calculating unit that uses a predetermined first evaluation function configured to indicate a degree of difference between a value of the contact acting force, which corresponds to any given value of the contact reaction force, and the measurement value for each of the plurality of types of contact states so as to determine a value of the contact reaction force at which the degree of difference becomes a minimum under a predetermined constrained condition that defines the range of a value of the feasible contact reaction force in each contact state and to determine an evaluation index value, which is a value of the first evaluation function corresponding to the determined value of the contact reaction force, and a second determining unit that determines whether or not the degree of difference indicated by the evaluation index value determined for one contact state is smaller than the degree of difference indicated by the evaluation index value determined for each contact state other than the one contact state, and to estimate the one contact state as the actual contact state in a case where the determination result of the first determining unit is affirmative and a determination result of the second determining unit is affirmative (a fourth aspect of the invention).

The term "degree of difference" means the degree of the magnitude of the difference between the value of the contact acting force, which corresponds to a given value of the contact reaction force, and the measurement value. As the magnitude of the difference increases, the degree of difference takes a larger value. As the degree of difference, an absolute value of the difference, a square value of the difference or the like may be adopted.

More specifically, the first evaluation function indicating the degree of difference is a function, the value of which (function value) has a tendency to monotonically increase or monotonically decrease as the degree of difference increases.

According to the fourth aspect of the invention, the estimation processing unit estimates the one contact state as the actual contact state if the determination result of the first determining unit is affirmative and the determination result of the second determining unit is also affirmative. The case where the determination result of the second determining unit is affirmative corresponds to the case where it is determined that the degree of difference indicated by the evaluation index value determined for the one contact state is smaller than the degrees of difference indicated by the evaluation index values determined for the contact states other than the one contact state.

Thus, the reliability of estimating the one contact state as the actual contact state can be enhanced.

In the third aspect of the invention, the following mode can be adopted in place of the fourth aspect of the invention. The estimation processing unit is configured to further include an evaluation index value calculating unit that uses a predetermined second evaluation function configured to indicate a degree of difference in total sum between a degree of difference between a value of the contact acting force, which corresponds to any given value of the contact reaction force, and the measurement value and a degree of difference between any given relative position or posture of the workpiece with respect to the distal end portion of the manipulator and a predetermined reference set value or a measurement value of the relative position or posture of the workpiece for each of the plurality of types of contact states, thereby to determine a set of the value of the contact reaction force and the value of the relative position/posture of the workpiece at which the degree of difference in total sum becomes a minimum under a predetermined constrained condition that defines a range of the value of a feasible contact reaction force in each contact state and also to determine an evaluation index value, which is a value of the second evaluation function corresponding to the determined set of the value of the contact reaction force and the values of the relative position/posture, and a second determining unit that determines whether or not the degree of difference in total sum indicated by the evaluation index value determined for the one contact state is smaller than the degree of difference in total sum indicated by the evaluation index values determined for each of the contact states other than the one contact state, and the estimation processing unit is also configured to estimate the one contact state as the actual contact state in a case where the determination result of the first determining unit is affirmative and a determination result of the second determining unit is affirmative (a fifth aspect of the invention).

In the fifth aspect of the invention, the meaning of the degree of difference between the value of the contact acting force corresponding to any given value of the contact reaction force and the measurement value is the same as the degree of difference in the fourth aspect of the invention.

Further, the degree of difference between any given relative position/posture of the workpiece with respect to the distal end portion of the manipulator and a predetermined reference set value or a measurement value of the relative position/posture of the workpiece means the degree of the magnitude of the difference between any given relative position/posture of the workpiece and the predetermined reference set value or the measurement value of the relative position/posture of the workpiece. As the magnitude of the difference increases, the degree of difference takes a larger value. As the degree of difference, an absolute value of the difference, a square value of the difference or the like may be adopted.

Further, the reference set value means the value of relative position/posture established in advance as the relative position/posture of the workpiece when the workpiece is held by the manipulator.

The relative position/posture means the set of the relative position and the relative posture of the workpiece with respect to the distal end portion of the manipulator.

More specifically, the second evaluation function indicating the degree of difference in total sum is a function, the value of which (function value) has a tendency to monotonically increase or monotonically decrease as the degree of difference in total sum increases.

According to the fifth aspect of the invention, the estimation processing unit estimates the one contact state as the actual contact state if the determination result of the first determining unit is affirmative and the determination result of the second determining unit is also affirmative. The case where the determination result of the second determining unit is affirmative corresponds to the case where it is determined that the degree of difference in total sum indicated by the evaluation index value determined for the one contact state is smaller than the degrees of difference in total sum indicated by the evaluation index values determined for the contact states other than the one contact state.

In this case, the degree of difference related to the relative position/posture of the workpiece in addition to the degree of difference related to the contact acting force is properly reflected on the evaluation index value used for the determination processing by the second determining unit.

Thus, according to the fifth aspect of the invention, the reliability of estimating the one contact state as the actual contact state can be further enhanced.

In the fourth aspect or the fifth aspect of the invention, the constrained condition given in the second aspect of the invention can be adopted as the predetermined constrained condition.

In the fourth aspect or the fifth aspect of the invention, if the determination result of the second determining unit is negative, then the actual contact state may be regarded as a type of contact state that is different from the foregoing one contact state.

Therefore, in the fourth aspect of the invention, the estimation processing unit may be configured to carry out processing for estimating the actual contact state from remaining contact states obtained by excluding the one contact state from the plurality of types of contact states in a case where the determination result of the second determining unit is negative (a sixth aspect of the invention).

Similarly, in the fifth aspect of the invention, the estimation processing unit may be configured to carry out processing for estimating the actual contact state from remaining contact states obtained by excluding the one contact state from the plurality of types of contact states in a case where the determination result of the second determining unit is negative (a seventh aspect of the invention).

In the sixth aspect and the seventh aspect of the invention, the processing for estimating the actual contact state from the remaining contact states obtained by excluding the one contact state from the plurality of types of contact states is carried out, thus allowing the estimation processing to be efficiently carried out.

In this case, if the remaining contact state is a single contact state, then the remaining contact state may be estimated as the actual contact state.

Further, if the remaining contact states are a plurality of types of contact states, then the same processing as that in the third aspect to the fifth aspect of the invention, for example, may be carried out on the remaining contact states thereby to estimate the actual contact state from the remaining contact states.

In the third aspect to the seventh aspect of the invention, the estimation processing unit is preferably configured to further include a manipulator control unit that operates, in a case where the determination result of the first determining unit is negative, the manipulator such that the measurement value of the contact acting force is changed toward a desired value determined to become a value that belongs only to a feasible contact reaction force range corresponding to any one contact state among the plurality of types of contact states, and a third determining unit that determines whether or not the measurement value of the contact acting force has been changed by the operation of the manipulator so as to be within the feasible contact acting force range to which the desired value belongs, and also configured to estimate, as the actual contact state, a contact state corresponding to the feasible contact acting force range to which the desired value belongs in a case where a determination result of the third determining unit is affirmative (an eighth aspect of the invention).

The affirmative determination result of the third determining unit means that the actual contact state is a contact state which permits a feasible contact acting force value that belongs only to the feasible contact reaction force range corresponding to one contact state.

In the eighth aspect of the invention, therefore, the estimation processing unit estimates the contact state corresponding to the feasible contact acting force range to which the desired value belongs as the actual contact state in the case where the determination result of the third determining unit is affirmative. This makes it possible to properly estimate the actual contact state even if the determination result of the first determining unit is negative.

As a more specific technique for the processing by the third determining unit, a technique used, for example, to carry out the same determination processing as that carried out by the first determining unit or the second determining unit by using the measurement value of the contact acting force after the manipulator is operated by the manipulator control unit may be adopted.

In the eighth aspect of the invention, if the determination result of the third determining unit is negative, then the actual contact state may be regarded as a type of contact state that is different from the contact state corresponding to the feasible contact acting force range to which the desired value belongs.

In the eighth aspect of the invention, therefore, the estimation processing unit may be configured to carry out processing for estimating the actual contact state from remaining contact states obtained by excluding the one contact state from the plurality of types of contact states in a case where the determination result of the third determining unit is negative (a ninth aspect of the invention).

With this arrangement, as with the sixth aspect or the seventh aspect of the invention, the processing for estimating the actual contact state from the remaining contact states obtained by excluding the one contact state from the plurality of types of contact states is carried out, thus allowing the estimation processing to be efficiently carried out.

In the eighth aspect or the ninth aspect of the invention, the manipulator control unit is preferably configured to operate the manipulator such that the measurement value of the contact acting force is changed toward the desired value and then return the manipulator to a state before the operation (a tenth aspect of the invention).

With this arrangement, the variations in the operation of the manipulator for moving the workpiece to a desired position can be suppressed, thus leading to enhanced stability of the operation.

Further, a workpiece contact state estimation method according to the present invention is a method for estimating, at a time of performing an operation for moving a workpiece held by a distal end portion of a manipulator to a desired position by the manipulator, a state of contact of a workpiece with a peripheral object, which is an object existing in a periphery of the desired position, the method comprising:

a step of acquiring a measurement value of a contact acting force, which is a force acting on the manipulator based on a contact reaction force applied to the workpiece from the peripheral object at a time of contact of the workpiece with the peripheral object; and a step of estimating, as an actual state of contact of the workpiece with the peripheral object, one contact state among a plurality of types of contact states based on a feasible contact acting force range, which is a feasible range of a value of the contact acting force prepared in advance for each of the plurality of types of contact states determined in advance as feasible states of contact of the workpiece with the peripheral object, and the measurement value of the contact acting force (an eleventh aspect of the invention).

According to the eleventh aspect of the invention, the same effects as those of the first aspect of the invention can be obtained. Further, the eleventh aspect of the invention may adopt the same modes as those in the second aspect to the tenth aspect of the invention.

BRIEF DESCRIPTION OF THE DRAWINGS

FIG. 2 is a block diagram illustrating the functional configuration of a controller that functions as a contact state estimating device;

FIG. 10A to FIG. 10C are diagrams illustrating the feasible contact acting force ranges in the contact state illustrated in FIG. 4B;

FIG. 11A to FIG. 11C are diagrams illustrating the feasible contact acting force ranges in the contact state illustrated in FIG. 5A;

FIG. 12A to FIG. 12C are diagrams illustrating the feasible contact acting force ranges in the contact state illustrated in FIG. 5B;

FIG. 13 is a flowchart illustrating the processing by the controller illustrated in FIG. 2; and FIG. 14A to FIG. 14E are diagrams illustrating the examples of the unique specific ranges extracted in STEP6 of FIG. 13.

DESCRIPTION OF THE PREFERRED EMBODIMENTS

First Embodiment

Figure 1:
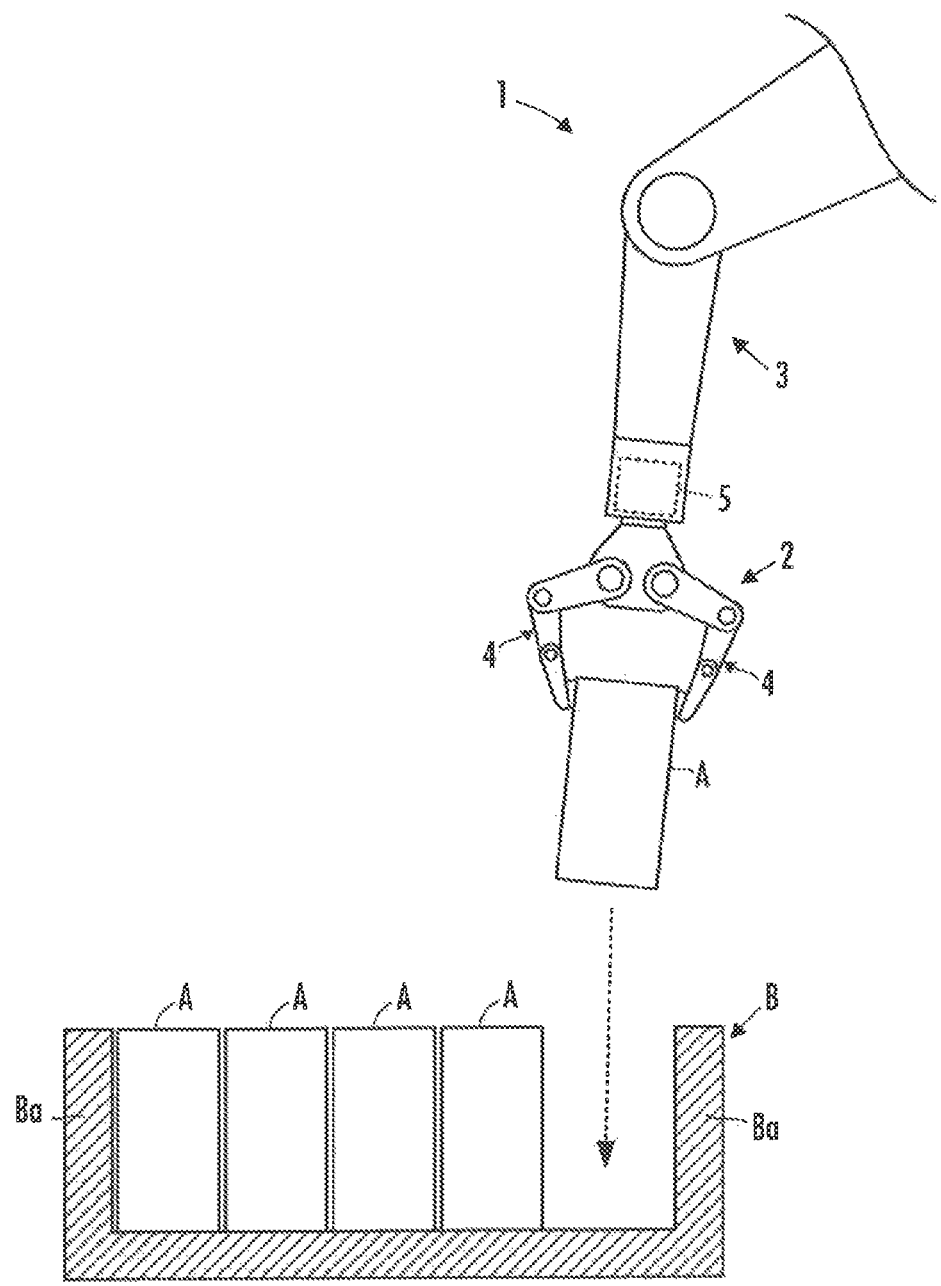
FIG. 1 is a diagram illustrating examples of a manipulator and a workpiece in an embodiment of the present invention.

A first embodiment of the present invention will be described with reference to FIG. 1 to FIG. 14E. Referring to FIG. 1, in the present embodiment, a description will be given of a case where an operation for arranging and placing, for example, a plurality of workpieces A, in a storage box B by a manipulator 1. In FIG. 1, the workpieces A are illustrated as rectangular parallelepiped workpieces. However, the workpieces A may have other shapes.

The manipulator 1 in the present embodiment is a robot provided with a multi-joint arm 3 having a hand 2, which grasps the workpiece A, attached to the distal end portion thereof. The manipulator 1 may be either a mobile robot or a stationary robot. Further, the manipulator 1 may be a robot which can be controlled by an operator in, for example, a master-slave mode.

The hand 2 has a pair of finger links 4, 4 configured to be openable and closable by an actuator (not illustrated). The hand 2 sandwiches (grasps) the workpiece A between the distal end portions of the finger links 4, 4 thereby to hold the workpiece A. In the held state, the workpiece A is grasped by the hand 2 such that the relative position and posture of the workpiece A with respect to the hand 2 are maintained substantially constant.

The configuration of the hand 2 is not limited to the configuration illustrated in FIG. 1. For example, the hand 2 may be provided with three or more finger links or provided with finger links that neither bend nor stretch. Further, the manipulator 1 may be provided with a mechanism that holds the workpiece A by making use of, for example, an attraction force, such as a magnet force or the like, or a suction force in place of the hand 2.

A force sensor 5 is mounted on a predetermined portion of the manipulator 1, such as the distal end portion (the mounting portion of the hand 2) of the arm 3. The force sensor 5 is a sensor that detects the force (contact acting force) applied to the manipulator 1 at the location, where the sensor 5 is mounted, according to the total contact reaction force applied to the workpiece A from an external object when the workpiece A grasped by the hand 2 comes in contact with the external object. The force sensor 5 is constituted of, for example, a 6-axis force sensor, to detect translational forces in three-axis directions and moments about three axes.

FIG. 2 illustrates a controller 10, which has the function for controlling the operation of the manipulator 1 configured as described above. The controller 10 is composed of not less than one electronic circuit unit, which includes a CPU, a RAM, a ROM, an interface circuit and the like, or not less than one computer, or a combination thereof. The controller 10 receives detection signals from the force sensor 5. Then, the controller 10 controls the operation of the manipulator 1 by a function implemented by installed hardware or programs.

The control of the operation of the manipulator 1 by the controller 10 will be outlined below. In the present embodiment, the controller 10 controls the operation of the manipulator 1 such that each workpiece A to be placed in the storage box B is grasped by the hand 2 outside the storage box B and then the workpiece A is moved to a desired position in the storage box B (a position at which the workpiece A is to be placed in the storage box B) by operating the arm 3.

In this case, the controller 10 determines the desired movement trajectory of the workpiece A to be newly placed in the storage box B on the basis of, for example, the information on the position of the storage box B, the desired position of each workpiece A in the storage box B, the order of placing the workpieces A in the storage box B (or the information on the arrangement of the workpieces A already placed in the storage box B) and the like. Then, the controller 10 controls the manipulator 1 to move each workpiece A to the desired position thereof in the storage box B basically according to the desired movement trajectory.

In this case, however, an actual movement trajectory of the workpiece A sometimes deviates from a desired movement trajectory due to a control error of the manipulator 1, a positional error of the grasp of the workpiece A by the hand 2, variations in the shape or dimensions of the workpiece A, or the like.

In such a case, the workpiece A may come in contact with a peripheral object existing around the desired position in the storage box B (the peripheral object in the present embodiment being the upper end of a side wall Ba of the storage box B or another workpiece A already placed in the storage box B) in a manner not expected in the desired movement trajectory, thus preventing the workpiece A from being moved to the desired position in the storage box B along the desired movement trajectory.

In such a case, the controller 10 appropriately corrects the desired movement trajectory of the workpiece A so as to enable the workpiece A to reach the desired position in the storage box B. In this case, in order to correct the desired movement trajectory of the workpiece A so as to permit smooth movement of the workpiece A to the desired position in the storage box B, the correction is desirably made in a manner suited to the type (pattern) of the state of the contact of the workpiece A with the peripheral object.

Figure 3A:
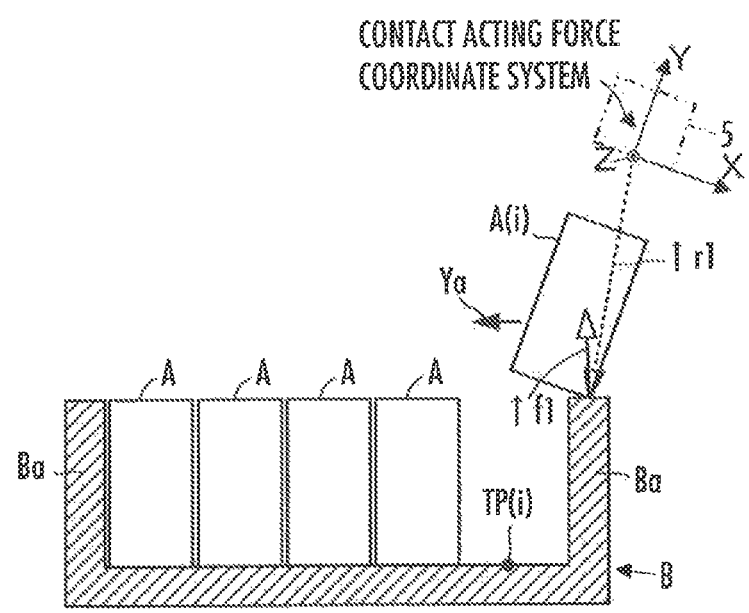
FIG. 3A and FIG. 3B are diagrams illustrating the exemplary patterns of the states of contact between the workpiece and a peripheral object.

For example, as illustrated in FIG. 3A, if a workpiece A(i) to be moved to a desired position TP(i) in the storage box B comes in contact with the upper end surface of the side wall Ba of the storage box B, then the desired movement trajectory of the workpiece A(i) is desirably corrected such that the workpiece A(i) is slid sideways as indicated by an arrow Ya and the workpiece A(i) is thereafter moved to the desired position TP(i).

The desired position TP(i) denotes the desired position of the representative point of the workpiece A(i), e.g. the central point on the lower end surface of the workpiece A(i).

Figure 3B:
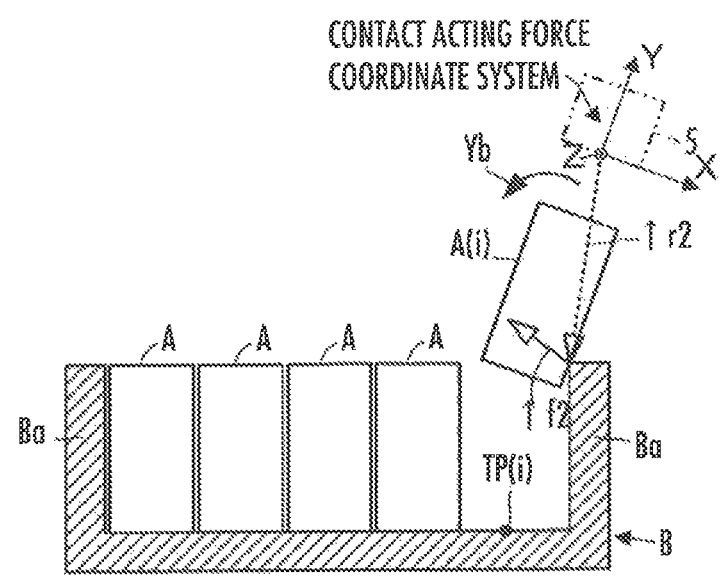

Further, if, for example, the workpiece A(i) to be moved to the desired position TP(i) in the storage box B comes in contact with the upper edge of the side wall Ba (the edge on the boundary of the upper end surface and the side wall surface) of the storage box B, as illustrated in FIG. 3B, then the desired movement trajectory of the workpiece A(i) is desirably corrected such that the workpiece A(i) is turned as indicated by an arrow Yb and then the workpiece A(i) is moved to the desired position TP(i) (or moved to the desired position TP(i) while rotating the workpiece A(i) as indicated by an arrow Yb).

Thus, when correcting the desired movement trajectory of the workpiece A after the contact according to the contact of the workpiece A with the peripheral object, the correction is desirably made in a manner suited to the type (pattern) of the state of the contact of the workpiece A with the peripheral object.

Hence, the controller 10 includes a function as the contact state estimating device in accordance with the present invention. With this function, if the workpiece A comes in contact with a peripheral object around a desired position while the workpiece A is being moved to the desired position in the storage box B, the contact state is estimated (more specifically, the type of contact state is estimated).

In this case, the controller 10 has, as the functions implemented by installed hardware or programs (software), a measurement value acquiring unit 11 that acquires, as necessary, the measurement value of a contact acting force from a received detection signal of the force sensor 5, a contact state information storage section 13 that stores and retains the information prepared in advance related to the state of contact between the workpiece A and a peripheral object that may occur in the process of movement of each workpiece A (contact state information), and an estimation processing unit 12 that estimates the actual state of contact between the workpiece A and a peripheral object by using the contact state information and the measurement value of the contact acting force.

The estimation processing unit 12 includes the functions as the first determining unit, the second determining unit, the third determining unit, and the evaluation index value calculating unit in the present invention.

The contact state information in the present embodiment includes the contact state type information that indicates each of the plurality of types of states of contact between the workpiece A and a peripheral object, which may occur in the process of the movement of each workpiece A, the contact acting force range information that indicates the feasible contact acting force range, which is the range of the value of a feasible contact acting force (a contact acting force that can be detected by the force sensor 5) based on the total contact reaction force applied to the workpiece A from a peripheral object in each contact state (the contact state of each type), and the information on the transition among the plurality of types of contact states (the information indicating the possibility of occurrence of the transition from a certain contact state to another contact state).

The foregoing contact state information is the information prepared for each desired position of each workpiece A in the storage box B. The contact state information corresponding to the desired positions of a plurality of workpieces A in the storage box B may be the same in some cases.

Among the contact state information, the contact state type information and the transition information are prepared by considering, for example, a desired reference movement trajectory for moving each workpiece A to its desired position in the storage box B, the estimated value of a maximum degree of deviation (the maximum degree of deviation attributable to a control error or the like) of an actual movement trajectory from the desired reference movement trajectory; and an area in which the side wall Ba of the storage box B or another workpiece A may exist around a desired position in the storage box B.

The contact state type information and the transition information may alternatively be prepared automatically by using a publicly known technique described in, for example, "Generating a contact state graph of polyhedral objects for robotic application"/Sung Jo Kwak, Seong Youb Chung, and Tsutomu Hasegawa/Intelligent Robots and Systems (IROS), 2010 IEEE/RSJ International Conference/on pp. 4522 to 4527).

The exemplary patterns of the contact states that can occur in the process of moving the workpiece A to its desired position in the storage box B are illustrated in FIG. 3A. FIG. 3B, FIG. 4A, FIG. 4B, FIG. 5A and FIG. 5B. These figures, FIG. 3A, FIG. 3B, FIG. 4A, FIG. 4B, FIG. 5A and FIG. 5B illustrate a plurality of types (four types in the present embodiment) of patterns of the contact states that can occur when the workpiece A(i) is moved to one desired position TP(i) in the storage box B.

Figure 4A:
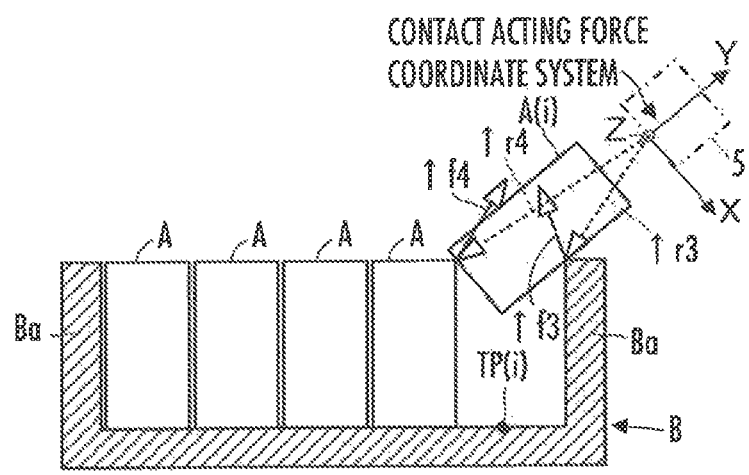
FIG. 4A and FIG. 4B are diagrams illustrating the exemplary patterns of the states of contact between the workpiece and a peripheral object.
Figure 4B:
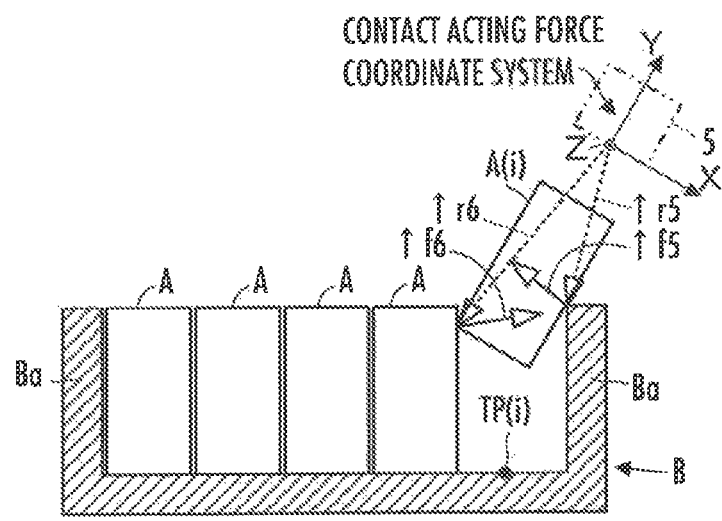
Figure 5A:
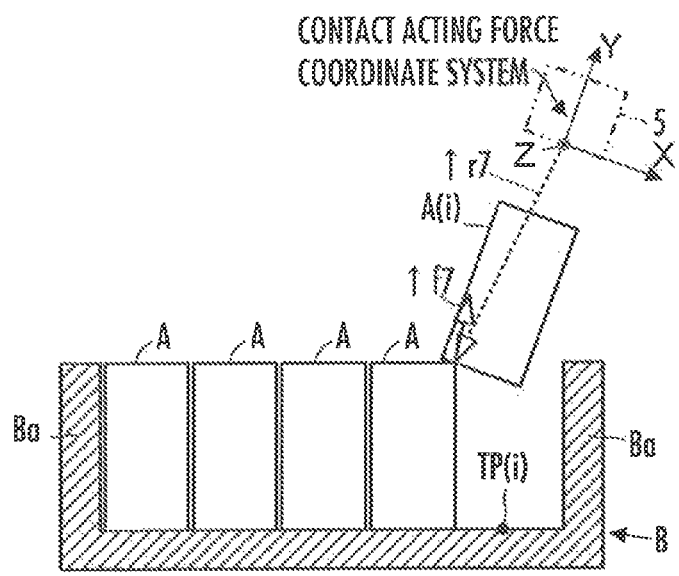
FIG. 5A and FIG. 5B are diagrams illustrating the exemplary patterns of the states of contact between the workpiece and a peripheral object.
Figure 5B:
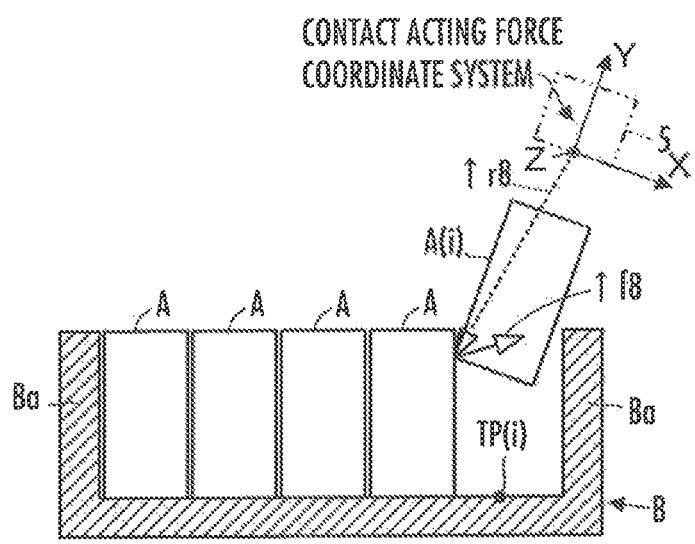

The contact state in FIG. 3A is a state in which the edge of the bottom surface of the workpiece A(i) has come in contact with the upper end surface of the side wall Ba of the storage box B, the contact state in FIG. 3B is a state in which the side surface of the workpiece A(i) has come in contact with the edge of the upper end surface of the side wall Ba of the storage box B, the contact state in FIG. 4A is a state in which the bottom surface of the workpiece A(i) has come in contact with the edge of the upper end surface of an already placed workpiece A adjacent to the workpiece A(i) and the side surface of the workpiece A(i) has come in contact with the edge of the upper end surface of the side wall Ba of the storage box B, the contact state in FIG. 4B is a contact state in which an edge of the bottom surface of the workpiece A(i) has come in contact with the side surface of an already placed workpiece A adjacent to the workpiece A(i) and the side surface of the workpiece A(i) has come in contact with the edge of the upper end surface of the side wall Ba of the storage box B, the contact state in FIG. 5A is a state in which the bottom surface of the workpiece A(i) has come in contact with the edge of the upper end surface of an adjacent workpiece A that has already been placed, and the contact state in FIG. 5B is a state in which the edge of the bottom surface of the workpiece A(i) has come in contact with the side surface of an already placed workpiece A adjacent to the workpiece A(i).

In the following description, the contact states in FIG. 3A, FIG. 3B, FIG. 4A, FIG. 4B, FIG. 5A, and FIG. 5B will be referred to as a contact state 3A, a contact state 3B, a contact state 4A, a contact state 4B, a contact state 5A, and a contact state 5B, respectively.

In this case, in the contact state 3A, the tilt angle of the workpiece A(i) with respect to the peripheral object (the side wall Ba of the storage box B) with which the workpiece A(i) is in contact takes any value within a predetermined range that can be regarded to be suited to the type of the contact state 4A.

Further, in the contact state 3B, the position of a contact portion of the workpiece A(i) with respect to the peripheral object (the side wall Ba of the storage box B) with which the workpiece A(i) is in contact (the position in the side surface of the workpiece A(i)) and the tilt angle of the workpiece A(i) with respect to the peripheral object take any values within predetermined ranges that can be regarded to be suited to the pattern of the contact state 3B.

Further, in the contact state 4A, the position of the contact portion of the workpiece A(i) (the position in the side surface of the workpiece A(i)) with respect to one peripheral object (the side wall Ba of the storage box B) of two peripheral objects with which the workpiece A(i) is in contact, the position of the contact portion of the workpiece A(i) (the position in the bottom surface of the workpiece A(i)) with respect to the other peripheral object (the workpiece A that has already been placed), and the tilt angles of the workpiece A(i) with respect to these two peripheral objects take any values within predetermined ranges that can be regarded to be suited to the pattern of the contact state 4A.

Further, in the contact state 4B, the position of the contact portion of the workpiece A(i) (the position in the side surface of the workpiece A(i)) with respect to one peripheral object (the side wall Ba of the storage box B) of two peripheral objects with which the workpiece A(i) is in contact, and the tilt angles of the workpiece A(i) with respect to the two peripheral objects take any values within predetermined ranges that can be regarded to be suited to the pattern of the contact state 4B.

Further, in the contact state 5A, the position of the contact portion of the workpiece A(i) (a position in the bottom surface of the workpiece A(i)) with respect to the peripheral object (the workpiece A that has already been placed) with which the workpiece A(i) is in contact, and the tilt angle of the workpiece A(i) with respect to the peripheral object take any values within predetermined ranges that can be regarded to be suited to the pattern of the contact state 5A.

Further, in the contact state 5B, the position of the contact portion of the workpiece A(i) (a position in the side surface of the workpiece A(i)) with respect to the peripheral object (the workpiece A that has already been placed) with which the workpiece A(i) is in contact, and the tilt angle of the workpiece A(i) with respect to the peripheral object take any values within predetermined ranges that can be regarded to be suited to the pattern of the contact state 5B.

Supplementarily, when moving the workpiece A(i) to the desired position TP(i) in the storage box B, a contact state that is different from the foregoing six types of contact states 3A, 3B, 4A, 4B, 5A, and 5B may occur, depending on a desired reference movement trajectory of the workpiece A(i), the shape of the storage box B, the shape of the workpiece A(i), or the like.

In the present embodiment, however, for the sake of convenience, the foregoing six types of contact states 3A, 3B, 4A, 4B, 5A, and 5B are illustrated as the contact states that can occur in the process of the movement of the workpiece A(i) in order to avoid a redundant description.

The pattern of the contact state that can occur in the process of moving the workpiece A to a desired position in the storage box B changes, also depending on the order of placing the workpieces A into the storage box B, or the like.

Other exemplary patterns of the contact states are illustrated in FIG. 6A to FIG. 6F. These drawings FIG. 6A to FIG. 6F illustrate a plurality of types (six types in the present embodiment) of patterns of contact states that can occur when one workpiece A(j) is moved to a desired position TP(j) close to the side wall Ba in the storage box B with no other workpiece A having been placed in the storage box B.

Figure 6A:
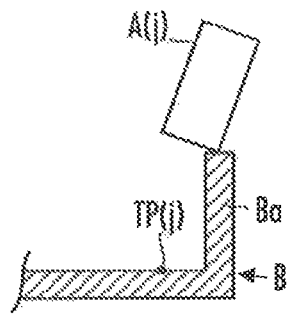
FIG. 6A to FIG. 6F are diagrams illustrating other examples of the patterns of the states of contact between the workpiece and the peripheral object.
Figure 6B:
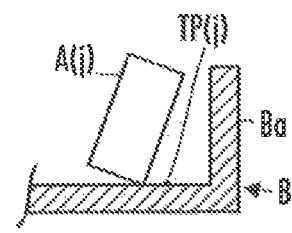
Figure 6C:
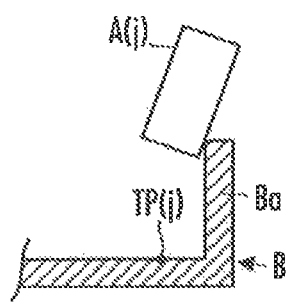
Figure 6D:
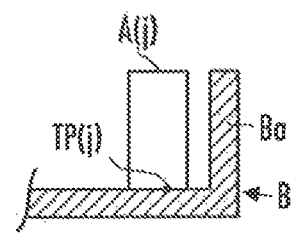
Figure 6E:
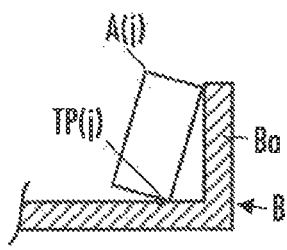
Figure 6F:
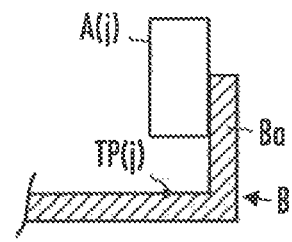
Figure 7A:
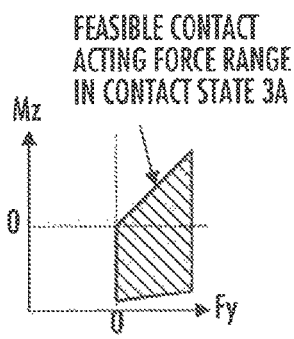
FIG. 7A to FIG. 7C are diagrams illustrating the feasible contact acting force ranges in the contact state illustrated in FIG. 3A.
Figure 7B:
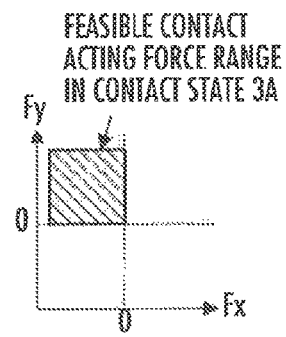
Figure 7C:
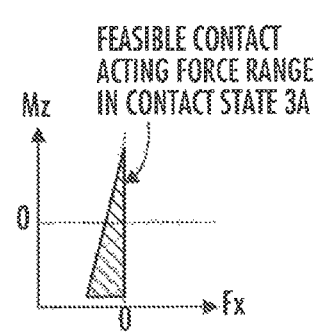
Figure 8A:
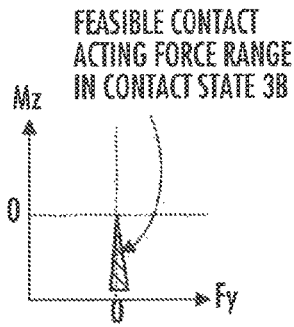
FIG. 8A to FIG. 8C are diagrams illustrating the feasible contact acting force ranges in the contact state illustrated in FIG. 3B.
Figure 8B:
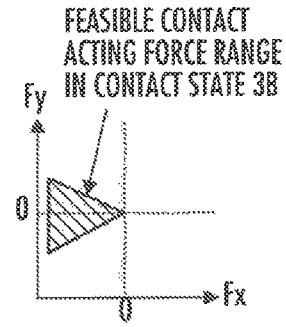
Figure 8C:
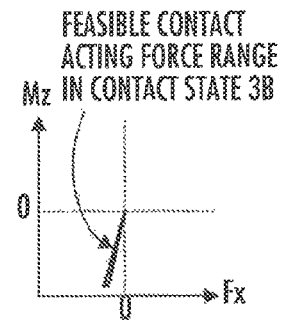
Figure 9A:
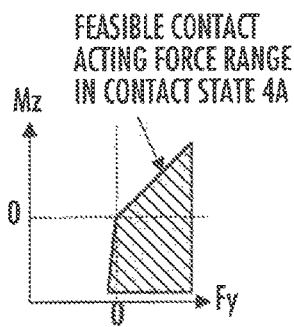
FIG. 9A to FIG. 9C are diagrams illustrating the feasible contact acting force ranges in the contact state illustrated in FIG. 4A.
Figure 9B:
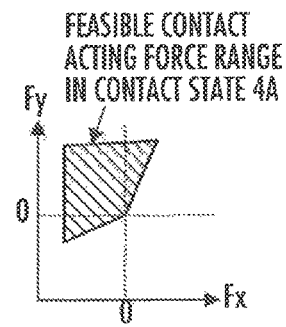
Figure 9C:
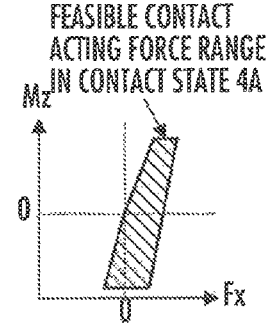

The contact state in FIG. 6A and the contact state in FIG. 6C are the contact states of the same patterns of the contact states 3A and 3B, respectively. The contact state in FIG. 6B is the state in which the edge of the bottom surface of the workpiece A(j) is in contact with the bottom surface of the storage box B. The contact state in FIG. 6D is a state in which the bottom surface of the workpiece A(j) is in contact with the bottom surface of the storage box B while being dislocated from the desired position TP(j). The contact state in FIG. 6E is a state in which the edge of the upper end surface of the workpiece A(j) is in contact with the side wall Ba of the storage box B and the edge of the bottom surface of the workpiece A(j) is in contact with the bottom surface of the storage box B. The contact state in FIG. 6F is a state in which the side surface of the workpiece A(j) is in surface contact with the side wall Ba of the storage box B.

Thus, the contact states that can occur in the process of moving the workpiece A to its desired position in the storage box B can take a variety of patterns according to the desired position in the storage box B, the accommodating order and the like.

In the contact state information, the feasible contact acting force range for each contact state indicated by the contact acting force range information is determined on the basis of the relationship between the contact reaction force applied from a peripheral object to each portion of contact of the workpiece A with the peripheral object and the contact acting force applied to the location where the force sensor 5 is disposed (the contact acting force that can be detected by the force sensor 5) according to the total contact reaction force (the total contact reaction force at every contact portion of the workpiece A and the peripheral object) in each contact state (the contact state of each type), and the constrained condition that defines the range of the contact reaction force applied to the workpiece A.

As available examples of the constrained conditions related to the contact reaction force, there are a constrained condition that limits a frictional force (translational frictional force) of a contact reaction force to a maximum static frictional force or less and a constrained condition that limits the direction of the drag of the contact reaction force (specifically, a constrained condition that prevents the direction of the drag from becoming a direction that causes the workpiece A to dent into a contact object, which is a peripheral object).

In this case, the relationship between the contact reaction force applied to the workpiece A and the contact acting force can be generally represented by a linear equality in the form of expression (1) given below. Further, the constrained condition related to the contact reaction force can be generally represented by a linear inequality in the form of expression (2) given below.

$$\uparrow F = G_{mat} \cdot \uparrow f \tag{1}$$

$$C_{mat} \cdot \uparrow f \leq \uparrow b \tag{2}$$

The direction of the inequality sign of expression (2) may be the opposite.

In the present specification, reference numerals preceded by "↑", such as ↑F, mean vectors (vertical vectors) each having a plurality of arranged components. Further, ↑F in expression (1) denotes a vector having the arranged components of the contact acting force (the translational force and the moment) observed in a coordinate system that represents the measurement values of the contact acting forces (hereinafter referred to as "the contact acting force coordinate system"), and ↑f in expressions (1) and (2) denotes a vector having the arranged components (the components in the contact acting force coordinate system) of the contact reaction force applied to the workpiece A at each of all portions of contact between the workpiece A and the peripheral object. Further, Gmat and Cmat denote matrices, and ↑b denotes a vector of a constant component.

If one portion of the workpiece A is in contact with the peripheral object (one portion being subjected to the contact reaction force), then ↑f will denote a vector indicating the contact reaction force at the one contact portion. If a plurality of portions of the workpiece A are in contact with the peripheral object, then ↑f will denote a vector having all the contact reaction force components at every contact portion arranged together.

More specifically, expression (1) is an equality that denotes a relationship in which the translational force of the resultant force of all contact reaction forces applied to the workpiece A from the peripheral object coincides with the translational force of the contact acting force, and the moment generated about the origin of the contact acting force coordinate system by the resultant force of the contact reaction forces coincides with the moment of the contact reaction force.

Therefore, Gmat in expression (1) denotes a matrix for converting the total contact reaction force observed in the contact acting force coordinate system into a contact acting force according to the foregoing relationship.

Further, expression (2) represents each of the constrained conditions related to the contact acting force at each portion of contact of the workpiece A with the peripheral object by a linear inequality in the form in which the linear combination value of each component of ↑f is a predetermined value or less (or a predetermined value or more), and combines the inequalities into one in the form of the matrix inequality.

Therefore, Cmat in expression (2) denotes a matrix in which the coefficients related to the foregoing linear combination values of a plurality of linear inequalities are arranged in each line, and ↑b denotes a vector having the predetermined values of the plurality of linear inequalities arranged.

As the examples in more specific forms of the foregoing expressions (1) and (2), the expressions corresponding to, for example, the contact states 3A, 3B, 4A, 4B, 5A, and 5B, will be given below. Expressions (1-3A) and (2-3A) are the expressions corresponding to the contact state 3A, expressions (1-3B) and (2-3B) are the expressions corresponding to the contact state 3B, expressions (1-4A) and (2-4A) are the expressions corresponding to the contact state 4A, expressions (1-4B) and (2-4B) are the expressions corresponding to the contact state 4B, expressions (1-5A) and (2-5A) are the expressions corresponding to the contact state 5A, and expressions (1-5B) and (2-5B) are the expressions corresponding to the contact state 5B.

$$\begin{bmatrix} Fx \\ Fy \\ Mz \end{bmatrix} = \begin{bmatrix} 1 & 0 \\ 0 & 1 \\ -ry1 & rx1 \end{bmatrix} \cdot \begin{bmatrix} fx1 \\ fy1 \end{bmatrix} \quad (1\text{-}3A)$$

$$fx1 < 0 \text{ and } fy1 > 0 \quad (2\text{-}3A)$$

$$\begin{bmatrix} Fx \\ Fy \\ Mz \end{bmatrix} = \begin{bmatrix} 1 & 0 \\ 0 & 1 \\ -ry2 & rx2 \end{bmatrix} \cdot \begin{bmatrix} fx2 \\ fy2 \end{bmatrix} \quad (1\text{-}3B)$$

$$fx2 < 0 \text{ and } -\mu a \cdot (-fx2) < fy2 < \mu a \cdot (-fx2) \quad (2\text{-}3B)$$

$$\begin{bmatrix} Fx \\ Fy \\ Mz \end{bmatrix} = \begin{bmatrix} 1 & 0 & 1 & 0 \\ 0 & 1 & 0 & 1 \\ -ry3 & rx3 & -ry4 & rx4 \end{bmatrix} \cdot \begin{bmatrix} fx3 \\ fy3 \\ fx4 \\ fy4 \end{bmatrix} \quad (1\text{-}4A)$$

$$fx3 < 0 \text{ and } -\mu a \cdot (-fx3) < fy3 < \mu a \cdot (-fx3) \text{ and } fy4 > 0 \text{ and } -\mu b \cdot fy4 < fx4 < \mu b \cdot fy4 \quad (2\text{-}4A)$$

$$\begin{bmatrix} Fx \\ Fy \\ Mz \end{bmatrix} = \begin{bmatrix} 1 & 0 & 1 & 0 \\ 0 & 1 & 0 & 1 \\ -ry5 & rx5 & -ry6 & rx6 \end{bmatrix} \cdot \begin{bmatrix} fx5 \\ fy5 \\ fx6 \\ fy6 \end{bmatrix} \quad (1\text{-}4B)$$

$$fx5 < 0 \text{ and } -\mu a \cdot (-fx5) < fy5 < \mu a \cdot (-fx5) \text{ and } fy6 > 0 \text{ and } fx6 > 0 - \mu b \cdot fy6 < fx6 < \mu b \cdot fy6 \quad (2\text{-}4B)$$

$$\begin{bmatrix} Fx \\ Fy \\ Mz \end{bmatrix} = \begin{bmatrix} 1 & 0 \\ 0 & 1 \\ -ry7 & rx7 \end{bmatrix} \cdot \begin{bmatrix} fx7 \\ fy7 \end{bmatrix} \quad (1\text{-}5A)$$

$$fy7 > 0 \text{ and } -\mu b \cdot (-fy7) < fx7 < \mu b \cdot (-fy7) \quad (2\text{-}5A)$$

$$\begin{bmatrix} Fx \\ Fy \\ Mz \end{bmatrix} = \begin{bmatrix} 1 & 0 \\ 0 & 1 \\ -ry8 & rx8 \end{bmatrix} \cdot \begin{bmatrix} fx8 \\ fy8 \end{bmatrix} \quad (1\text{-}5B)$$

$$fy8 > 0 \text{ and } fx8 > 0 - \mu b \cdot fy8 < fx8 < \mu b \cdot fy8 \quad (2\text{-}5B)$$

In these expressions (1-3A), (2-3A), . . . , (1-5A), and (2-5B), the contact reaction force coordinate system is a coordinate system fixed with respect to the force sensor 5 (or the distal end portion of the arm 3 of the manipulator 1), as illustrated in FIG. 3A, FIG. 3B, FIG. 4A, FIG. 4B, FIG. 5A, and FIG. 5B. In the example, an X-axis direction and a Y-axis direction orthogonal thereto of the contact reaction force coordinate system are the directions that are parallel (or substantially parallel) to the bottom surface of the workpiece A(i), and a Z-axis direction is the direction orthogonal to the X-axis and the Y-axis. Further, the expressions (1-3A), (1-3B), (1-4A), (1-4B), (1-5A), and (1-5B) are expressions which relate to three components, namely, a component Fx in the X-axis direction and a component Fy in the Y-axis direction of the translational force of the contact acting force, and a component Mz about the Z-axis of the moment of the contact acting force, and which correspond to the foregoing expression (1) (expressions related to Fx, Fy, and Mz in expression (1)).

Expressions (2-3A), (2-3B), (2-4A), and (2-4B) are a plurality of inequalities corresponding to the foregoing expression (2). Expressions (2-3A), (2-3B), (2-4A), (2-4B), (2-5A), and (2-5B) can be integrated to the form of expression (2).

In the foregoing expressions (1-3A) and (2-3A), rx1 and ry1 denote an X-axis coordinate component and a Y-axis coordinate component, respectively, of a position vector (↑r1 illustrated in FIG. 3A) of a contact portion of the workpiece A(i) with respect to the peripheral object (the side wall Ba of the storage box B) with which the workpiece A(i) comes in contact in the contact state 3A, and fx1 and fy1 denote a component in the X-axis direction and a component in the Y-axis direction, respectively, of the contact reaction force (↑f1 illustrated in FIG. 3A) applied to the workpiece A(i) at the contact portion.

In the foregoing expressions (1-3B) and (2-3B), rx2 and ry2 denote an X-axis coordinate component and a Y-axis coordinate component, respectively, of a position vector (↑r2 illustrated in FIG. 3B) of a contact portion of the workpiece A(i) with respect to the peripheral object with which the workpiece A(i) comes in contact in the contact state 3B, fx2 and fy2 denote a component in the X-axis direction and a component in the Y-axis direction, respectively, of the contact reaction force (↑f2 illustrated in FIG. 3B) applied to the workpiece A(i) at the contact portion, and μa denotes the coefficient of friction (set value) between the workpiece A(i) and the peripheral object (the side wall Ba of the storage box B).

The position vector ↑r2 at the contact portion in the contact state 3B takes a variable value within a predetermined range.

In the foregoing expressions (1-4A) and (2-4A), rx3 and ry3 denote an X-axis coordinate component and a Y-axis coordinate component, respectively, of a position vector (↑r3 illustrated in FIG. 4A) of a contact portion of the workpiece A(i) with respect to one peripheral object (the side wall Ba of the storage box B) of two peripheral objects (the side wall Ba of the storage box B and another workpiece A that has already been placed) with which the workpiece A(i) comes in contact in the contact state 4A, fx3 and fy3 denote a component in the X-axis direction and a component in the Y-axis direction, respectively, of the contact reaction force (↑f3 illustrated in FIG. 4A) applied to the workpiece A(i) at the contact portion with respect to the one peripheral object, μa denotes the coefficient of friction (set value) between the workpiece A(i) and the one peripheral object (the side wall Ba of the storage box B), rx4 and ry4 denote an X-axis coordinate component and a Y-axis coordinate component, respectively, of a position vector (↑r4 illustrated in FIG. 4A) of a contact portion of the workpiece A(i) with respect to the other peripheral object (another workpiece A that has already been placed), fx4 and fy4 denote a component in the X-axis direction and a component in the Y-axis direction, respectively, of the contact reaction force (↑f4 illustrated in FIG. 4A) applied to the workpiece A(i) at the contact portion with respect to the other peripheral object, and μb denotes the coefficient of friction (set value) between the workpiece A(i) and the other peripheral object (another workpiece A that has already been placed).

The position vectors ↑r3 and ↑r4 at the contact portions in the contact state 4A take variable values within a predetermined range.

In the foregoing expressions (1-4B) and (2-4B), rx5 and ry5 denote an X-axis coordinate component and a Y-axis coordinate component, respectively, of a position vector (↑r5 illustrated in FIG. 4B) of a contact portion of the workpiece A(i) with respect to one peripheral object (the side wall Ba of the storage box B) of two peripheral objects (the side wall Ba of the storage box B and another workpiece A that has already been placed) with which the workpiece A(i) comes in contact in the contact state 4B, fx5 and fy5 denote a component in the X-axis direction and a component in the Y-axis direction, respectively, of the contact reaction force (↑f5 illustrated in FIG. 4B) applied to the workpiece A(i) at the contact portion with respect to the one peripheral object, μa denotes the coefficient of friction (set value) between the workpiece A(i) and the one peripheral object (the side wall Ba of the storage box B), rx6 and ry6 denote an X-axis coordinate component and a Y-axis coordinate component, respectively, of a position vector (↑r6 illustrated in FIG. 4B) of a contact portion of the workpiece A(i) with respect to the other peripheral object (another workpiece A that has already been placed), fx6 and fy6 denote a component in the X-axis direction and a component in the Y-axis direction, respectively, of the contact reaction force (↑f6 illustrated in FIG. 4B) applied to the workpiece A(i) at the contact portion with respect to the other peripheral object, and μb denotes the coefficient of friction (set value) between the workpiece A(i) and the other peripheral object (another workpiece A that has already been placed).

The position vectors ↑r5 and ↑r6 at the contact portions in the contact state 4B take variable values within a predetermined range.

In the foregoing expressions (1-5A) and (2-5A), rx7 and ry7 denote an X-axis coordinate component and a Y-axis coordinate component, respectively, of a position vector (↑r7 illustrated in FIG. 5A) of a contact portion of the workpiece A(i) with respect to the peripheral object (another workpiece A that has already been placed) with which the workpiece A(i) comes in contact in the contact state 5A, fx7 and fy7 denote a component in the X-axis direction and a component in the Y-axis direction, respectively, of the contact reaction force (↑f7 illustrated in FIG. 5A) applied to the workpiece A(i) at the contact portion, and μb denotes the coefficient of friction (set value) between the workpiece A(i) and the peripheral object (another workpiece A that has already been placed).

The position vector ↑r7 at the contact portion in the contact state 5A takes a variable value within a predetermined range.

In the foregoing expressions (1-5B) and (2-5B), rx8 and ry8 denote an X-axis coordinate component and a Y-axis coordinate component, respectively, of a position vector (↑r8 illustrated in FIG. 5B) of a contact portion of the workpiece A(i) with respect to the peripheral object (another workpiece A that has already been placed) with which the workpiece A(i) comes in contact in the contact state 5B, fx8 and fy8 denote a component in the X-axis direction and a component in the Y-axis direction, respectively, of the contact reaction force (↑f8 illustrated in FIG. 5B) applied to the workpiece A(i) at the contact portion, and μb denotes the coefficient of friction (set value) between the workpiece A(i) and the peripheral object (another workpiece A that has already been placed).

The feasible contact acting force range of each contact state is determined by calculating the range of the set of the values of the contact acting force ↑F (the set of values of the components of ↑F) that satisfies the relational expression of the foregoing expression (1) under the constrained condition indicated by the foregoing expression (2). In this case, the feasible contact acting force range of each contact state can be determined by using, for example, publicly known solution processing for a linear programming problem.

The examples of the feasible contact acting force ranges are illustrated in FIG. 7A to FIG. 12C. FIG. 7A, FIG. 8A, FIG. 9A, FIG. 10A, FIG. 11A, and FIG. 12A are diagrams illustrating the feasible ranges of the set of components Fy and Mz of the contact acting force in the contact states 3A, 3B, 4A, 4B, 5A, and 5B, respectively, by the hatched areas on two-dimensional planes. FIG. 7B, FIG. 8B, FIG. 9B, FIG. 10B, FIG. 11B, and FIG. 12B are diagrams illustrating the feasible ranges of the set of components Fx and Fy of the contact acting force in the contact states 3A, 3B, 4A, 4B, 5A, and 5B, respectively, by the hatched areas on the two-dimensional planes. FIG. 7C, FIG. 8C, FIG. 9C, FIG. 10C, FIG. 11C, and FIG. 12C are diagrams illustrating the feasible ranges of the set of components Fx and Mz of the contact acting force in the contact states 3A, 3B, 4A, 4B, 5A, and 5B, respectively, by the hatched areas on the two-dimensional planes.

The feasible contact acting force ranges corresponding to the contact states 3A, 3B, 4A, 4B, 5A, and 5B are calculated on the basis of the set of the expressions (1-3A) and (2-3A), the set of the expressions (1-3B) and (2-3B), the set of the expressions (1-4A) and (2-4A), the set of the expressions (1-4B) and (2-4B), the set of the expressions (1-5A) and (2-5A), and the set of the expressions (1-5B) and (2-5B), respectively.

Further, FIG. 7A, FIG. 8A, FIG. 9A, FIG. 10A, FIG. 11A, and FIG. 12A illustrate the feasible ranges of the set of Fy and Mz when a component other than Fy and Mz (i.e. the component Fx in this case) in the whole feasible contact acting force range calculated as described above takes a fixed value. Further, FIG. 7B, FIG. 8B, FIG. 9B, FIG. 10B, FIG. 11B, and FIG. 12B illustrate the feasible ranges of the set of Fx and Fy when a component other than Fx and Fy (i.e. the component Mz in this case) in the whole feasible contact acting force range takes a fixed value. Further, FIG. 7C, FIG. 8C, FIG. 9C, FIG. 10C, FIG. 11C, and FIG. 12C illustrate the feasible ranges of the set of Fx and Mz when a component other than Fx and Mz (i.e. the component Fy in this case) in the whole feasible contact acting force range takes a fixed value.

The feasible contact acting force range corresponding to each state of contact between the workpiece A and the peripheral object is generally a polyhedral region in a multidimensional space in which all the components of the contact acting force are variable components.

A specific description will now be given of the processing for estimating the contact state of the workpiece A carried out by the controller 10. The controller 10 carries out the processing illustrated by the flowchart of FIG. 13 to move each workpiece A grasped by the hand 2 of a manipulator 1 to a desired position in the storage box B. In the following description, the workpiece A that is about to be moved into the storage box B will be referred to as the target workpiece A.

The controller 10 determines in STEP1 whether the current instant is the timing for estimating a contact state. In the present embodiment, the determination result in STEP1 becomes affirmative when, for example, the target workpiece A first comes in contact with the storage box B in the process of moving the target workpiece A into the storage box B. In this case, whether the target workpiece A has come in contact with the storage box B can be determined on the basis of, for example, the measurement value of the contact acting force indicated by a detection signal of the force sensor 5.

Then, after the first contact between the target workpiece A and the storage box B, the determination result in STEP1 becomes affirmative at a predetermined timing based mainly on a change in the measurement value of the contact acting force indicated by a detection signal of the force sensor 5 by the time the workpiece A reaches its desired position in the storage box B.

If the determination result in STEP1 is negative, then the controller 10 sequentially repeats the determination processing of STEP1. Then, when the determination result in STEP1 becomes affirmative, the controller 10 acquires in STEP2 the measurement value (the current value) of the contact acting force indicated by the detection signal of the force sensor 5 by the measurement value acquiring unit 11 in a state in which the movement of the target workpiece A is being temporarily suspended (i.e. in the state in which the position and the posture of the target workpiece A are maintained constant).

Further, the controller 10 determines the candidates of the current contact state of the target workpiece A in STEP3. In this case, the controller 10 identifies the contact states that can be regarded as impossible at the current time among all the types of contact states stored and retained in the contact state information storage section 13 corresponding to the desired positions in the storage box B, in which the target workpiece A is to be placed, on the basis of the estimation history of the contact state of the target workpiece A (i.e. the estimation history from the start of the movement of the workpiece A to the current time) and the information on the transition among the contact states stored and retained in connection with the target workpiece A in the contact state information storage section 13. Then, the controller 10 excludes the identified contact states from all the types of contact states related to the target workpiece A, thereby determining the candidates of the current contact state.

If, for example, the target workpiece A is the workpiece A(i) to be moved to the desired position TP(i) in the storage box B, then the six types of contact states, namely, 3A, 3B, 4A, 4B, 5A, and 5B are determined as the candidates at the point when the workpiece A(i) first comes in contact with the storage box B.

Subsequently, in STEP4, the controller 10 acquires the feasible contact acting force range indicated by the contact acting force range information stored and retained for each contact state candidate in the contact state information storage section 13.

Further, the controller 10 extracts in STEP5 the contact acting force range that enables one contact state to be uniquely identified (hereinafter referred to as "the unique specific range") from the feasible contact acting force ranges corresponding to all the contact state candidates.

The unique specific range is the range of contact acting force that is feasible only in one contact state among all the contact state candidates. In other words, the unique specific range is a range that belongs to the feasible contact acting force range related to one contact state among all the contact state candidates and, at the same time, the range that does not belong to the feasible contact acting force ranges related to other contact states.

More specifically, if the sets of the total contact acting force belonging to the feasible contact acting force ranges related to the candidates of the contact state are denoted by $S(1), S(2), \ldots, S(N)$ (N denoting the total number of the candidates), and the total set of the contact acting force related to the foregoing one contact state is denoted by $S(1)$, then the unique specific range will be the range of a set defined by $S(1)-(S(1) \cap (S(2) \cup \ldots \cup S(N)))$.

For example, if the workpiece A(i) is the target workpiece A and the six types of contact states, namely, 3A, 3B, 4A, 4B, 5A, and 5B, are determined as the candidates in STEP3, then a partial range (the range of the hatched region in FIG. 14A) of the feasible contact acting force range related to the contact state 4B is extracted as the unique specific range, as illustrated in FIG. 14A. The unique specific range illustrated in FIG. 14A is the range for the set of Fy and Mz in the case where the value of Fx is a fixed value.

Subsequently, the controller 10 determines in STEP6 whether the measurement value of the contact acting force acquired in the above STEP2 is a measurement value within the unique specific range.

If the determination result in STEP6 is affirmative, then the actual contact state of the target workpiece A is very likely the candidate contact state corresponding to the unique specific range (more specifically, the contact state in which the unique specific range is included in the feasible contact acting force range).

However, if the measurement value of the contact acting force is a value in the vicinity of the boundary of the unique specific range (if the measurement value is a value in the vicinity of the feasible contact acting force range corresponding to the contact state of a candidate that is different from the candidate corresponding to the unique specific range) or the like, then the measurement value of the contact acting force may undesirably belong to the unique specific range even when the actual contact state is not the candidate contact state corresponding to the unique specific range due to, for example, a measurement error of the contact acting force or variations in the actual position or posture of the workpiece A with respect to the hand 2 at the distal end of the manipulator 1.

Hence, if the determination result in STEP6 is affirmative, the controller 10 further calculates the likelihood of each candidate of the contact state in STEP7. The likelihood is an index value that indicates the degree of probability of each candidate being the actual contact state.

In the present embodiment, as the index value indicative of the likelihood of each candidate, a value is adopted, which is calculated according to expression (4) by using, for example, an evaluation function FE1 (↑f) defined by expression (3) given below.

$$FE1(\uparrow f)=(\uparrow Fs-Gmat\cdot\uparrow f)^T\cdot D1\cdot(\uparrow Fs-Gmat\cdot\uparrow f) \quad (3)$$

$$\text{Likelihood}=\exp(-FE1(\uparrow fe)) \quad (4)$$

In expression (3). ↑Fs denotes the measurement value of a contact acting force. D1 denotes a weight matrix (diagonal matrix) set in advance, and Gmat denotes the matrix on the right side of the foregoing expression (1) related to the contact state of each candidate. Further, ↑fe in expression (4) denotes the value of the contact reaction force ↑f at which the value of the evaluation function FE1 (↑f) of expression (3) becomes a minimum under the constrained condition represented by the inequality of the foregoing expression (2) related to the contact state of each candidate, and FE1 (↑fe) denotes the value of the evaluation function FE1 (↑f) when ↑f=↑fe.

Further, exp( ) means the exponential function of the base of natural logarithm, and the superscript "T" means transposition. As the weight matrix D1, an identity matrix, for example, may be adopted. In this case, the right side of expression (3) will be a square value of the vector (↑Fs−Gmat·↑f).

The evaluation function FE1 (↑f) is a function that indicates the degree of difference (the degree of the magnitude of the difference) between the value of the contact acting force ↑F corresponding to a given value of the contact reaction force ↑f (=Gmat·↑f) and the measurement value ↑Fs of the contact acting force. A smaller value of the function (a value being closer to zero) means a smaller degree of difference.

In other words, therefore, ↑fe takes the value of the contact reaction force ↑f at which the value of the contact acting force ↑F corresponding to a value of the contact reaction force ↑f that satisfies the constrained condition of the foregoing expression (2) related to each candidate of contact state provides a smallest degree of difference from (meaning the highest degree of coincidence with) the measurement value ↑Fs.

Further, the index value indicating the degree of coincidence between the value of ↑F corresponding to the foregoing ↑fe (=Gmat·↑fe) and the measurement value ↑Fs is the value of the likelihood calculated according to the foregoing expression (4). In this case, the likelihood calculated according to expression (4) increases as the degree of difference between the value of ↑F corresponding to ↑fe (=Gmat·↑fe) and the measurement value ↑Fs decreases.

In the present embodiment, the controller 10 calculates in STEP7 the value of the foregoing value of ↑fe (i.e. the value of the contact reaction force ↑f at which the value of the evaluation function FE1 (↑f) becomes a minimum) for each candidate of contact state by, for example, a publicly known solution technique of a constrained linear least squares problem. Then, the controller 10 uses the value of the evaluation function FE1 corresponding to the value of the ↑fe (=FE1 (↑fe)) to calculate the likelihood of each candidate of contact state according to the foregoing expression (4).

Then, the controller 10 determines in STEP8 whether the likelihood determined for the candidate corresponding to the unique specific range among the candidates of contact states is higher than the likelihoods determined for other candidates by a predetermined amount or more. The determination processing in this STEP8 is equivalent to the processing for determining whether the degree of difference (or FE1 (↑fe)) between the value of ↑F corresponding to ↑fe (=Gmat·↑fe) determined for the candidate corresponding to the unique specific range and the measurement value ↑Fs is smaller than the degrees of differences (or FE1 (↑fe)) between the values of ↑F corresponding to ↑fe (=Gmat·↑fe) determined for other candidates and the measurement values ↑Fs by a predetermined amount or more.

Subsequently, if the determination result in STEP8 is affirmative, then the controller 10 estimates the candidate corresponding to the unique specific range as the actual contact state in STEP9.

For example, a case is assumed, where the target workpiece A is the workpiece A(i), the measurement value of the contact acting force acquired in STEP2 is the measurement value corresponding to a point P1 in FIG. 14A, and the actual contact state is the contact state 4B. In this case, with respect to the unique specific range related to contact state 4B, the determination result in STEP6 is affirmative and the determination result in STEP8 is affirmative. In this case, the contact state 4B will be estimated as the actual contact state in STEP9.

After the processing in STEP9, the controller 10 carries out the processing from STEP1 again.

Meanwhile, if the determination result in STEP8 is negative, then the candidate corresponding to the unique specific range can be regarded not as the actual contact state. In this case, the controller 10 deletes in STEP13 the candidate corresponding to the unique specific range from the candidates of contact states determined in STEP3.

Subsequently, the controller 10 determines in STEP14 whether the number of remaining candidates is one. If the determination result in STEP14 is affirmative, then the controller 10 estimates the remaining one candidate as the actual contact state in STEP15.

After the processing in STEP15, the controller 10 carries out the processing from STEP1 again.

If the determination result in STEP14 is negative, then the controller 10 carries out the processing from STEP5 again on the remaining candidates.

If the determination result in the foregoing STEP6 is negative, then the controller 10 adjusts in STEP10 the position/posture (more specifically, one or both of the position and the posture) of the target workpiece A such that the measurement value of the contact acting force changes to be within the unique specific range extracted in STEP5.

Specifically, the controller 10 sets the contact acting force at a predetermined representative point (e.g. the central point) in the unique specific range as a desired value. Further, the controller 10 determines the adjustment amount or amounts of the position/posture of the target workpiece A according to the difference between the desired value and the measurement value (the current value) of the contact acting force so as to bring the difference close to zero. The adjustment amount or amounts are extremely small. Then, the controller 10 controls the manipulator 1 to correct the position/posture of the workpiece A from the current position/posture by the determined adjustment amount or amounts. Thus, the position/posture of the target workpiece A is or are adjusted so as to change the measurement value of the contact acting force to be within the unique specific range.

Subsequently, the controller 10 acquires the measurement value of the contact acting force based on a detection signal of the force sensor 5 (the measurement value after the adjustment of the position/posture of the target workpiece A) in STEP11 and then controls the manipulator 1 to set the position/posture of the target workpiece A back to the original position/posture before the adjustment (i.e. to return the amount of displacement of each joint of the manipulator 1 to the amount of displacement before the adjustment of the position/posture of the target workpiece A) in STEP12.

Then, the controller 10 carries out the processing from the foregoing STEP7. In this case, the processing in STEP7 calculates the likelihood of each candidate by using the measurement value acquired in STEP11.

If the actual contact state of the target workpiece A is the contact state of the candidate corresponding to a unique specific range, then the measurement value of the contact acting force will become a value within the unique specific range by the processing in STEP10. In this case, therefore, the determination result in STEP8 will be affirmative. As a result, the candidate corresponding to the unique specific range will be estimated as the actual contact state.

For example, a case is assumed, where the target workpiece A is the workpiece A(i), the measurement value of the contact acting force acquired in STEP2 is the measurement value corresponding to a point P2$a$ in FIG. 14A, and the actual contact state is the foregoing contact state 4B. In this case, with respect to the unique specific range related to the contact state 4B, the determination result in STEP6 will be negative, but the measurement value of the contact acting force acquired in STEP11 after the processing in STEP10 will change to a measurement value corresponding to, for example, a point P2$b$ in FIG. 14A. As a result, the determination result in STEP8 becomes affirmative. In this case, the contact state 4B will be estimated as the actual contact state in STEP9.

Meanwhile, if the actual contact state of the target workpiece A is not the contact state of the candidate corresponding to the unique specific range, then the measurement value of the contact acting force cannot be changed to a value within the unique specific range even after the processing in STEP10 is carried out. In this case, therefore, the determination result in STEP8 will be negative. As a result, the candidate corresponding to the unique specific range will be excluded from the candidates of the actual contact state in STEP13.

For example, a case is assumed, where the target workpiece A is the workpiece A(i), the measurement value of the contact acting force acquired in STEP2 is the measurement value corresponding to a point P2$a$ in FIG. 14A, and the actual contact state is a contact state other than the foregoing contact state 4B. In this case, with respect to the unique specific range related to the contact state 4B, the determination result in STEP6 will be negative. Further, the measurement value of the contact acting force acquired in STEP11 cannot be changed to a value within the unique specific range related to the contact state 4B even after the processing in STEP10 is carried out. As a result, the determination result in STEP8 will be negative. In this case, the contact state 4B will be deleted from the candidates of the actual contact state in STEP13.

In the case where the target workpiece A is the workpiece A(i), if the contact state 4B has been deleted from the candidates of the actual contact states in STEP13, then the unique specific range related to the contact state 5B (the unique specific range related to the set of Fy and Mz in the illustrated example) illustrated in FIG. 14B, for example, can be extracted by the processing in STEP5. Further, if the contact state 4B and the contact state 5B have been deleted from the candidates of the actual contact states in STEP13, then the unique specific range related to the contact state 3A (the unique specific range related to the set of Fx and Mz in the illustrated example) illustrated in FIG. 14C, for example, can be extracted by the processing in STEP5.

Further, if the contact state 4B, the contact state 5B, and the contact state 3A have been deleted from the candidates of the actual contact states in STEP13, then the unique specific range related to the contact state 4A (the unique specific range related to the set of Fx and Fy in the illustrated example) illustrated in FIG. 14D, for example, can be extracted by the processing in STEP5. Further, if the contact state 4B, the contact state 5B, the contact state 3A, and the contact state 4A have been deleted from the candidates of the actual contact states in STEP13, then the unique specific range related to the contact state 5A (the unique specific range related to the set of Fy and Mz in the illustrated example) illustrated in FIG. 14E, for example, can be extracted by the processing in STEP5.

Thus, which contact state among the six types of candidates (the contact states 3A, 3B, 4A, 4B, 5A, and 5B) applies to the actual contact state of the workpiece A(i) as the target workpiece A can be eventually estimated.

The controller 10 estimates, by the processing described above, the contact state of the target workpiece A each time the determination result in STEP1 becomes affirmative.

In the above description, the case where the target workpiece A is the workpiece A(i) has been taken as a representative example. However, the same method described above can be used to estimate the contact states of other workpieces A, including a workpiece A(j), illustrated in FIG. 6A to FIG. 6F.

Supplementarily, the relationship of correspondence between the present embodiment and the present invention will be described. In the present embodiment, the processing in STEP3 to STEP10 and STEP12 to STEP15 is the processing carried out by the estimation processing unit 12, and the processing in STEP2 and STEP11 is the processing carried out by the measurement value acquiring unit 11. Further, the foregoing evaluation function FE1 (↑f) corresponds to the first evaluation function in the present invention, and FE1 (↑fe) corresponds to the evaluation index value in the present invention.

Further, the determination processing in STEP6 corresponds to the processing by the first determining unit in the present invention, the processing for calculating the value of FE1 (↑fe) in the processing in STEP7 corresponds to the processing by the evaluation index value calculating unit in the present invention, the processing in STEP8 carried out when the determination result in STEP6 is affirmative corresponds to the processing by the second determining unit in the present invention, and the processing in STEP8 carried out after the processing in STEP12 corresponds to the processing by the third determining unit in the present invention.

Further, the processing in STEP10 and STEP12 corresponds to the processing by the manipulator control unit in the present invention.

When having the manipulator 1 perform the operation for accommodating each of a plurality of workpieces A in the storage box B, the present embodiment described above makes it possible to selectively estimate the contact state candidate, among a plurality of types of the contact state candidates, that applies to the actual state of contact between the workpiece A and a peripheral object (in the present embodiment, the side wall Ba of the storage box B or another workpiece A that has already been placed) during the movement of each workpiece A by using the measurement value of a contact acting force and the feasible contact acting force range corresponding to each of the plurality of types of the contact state candidates.

The arrangement provides a clear policy for how the workpiece A should be moved in order to move the workpiece A to its desired position in the storage box B after the workpiece A comes in contact with a peripheral object. This in turn makes it possible to change the position or the posture of the workpiece A, as necessary, according to a pattern suited to the state of contact between the workpiece A and the peripheral object, thus enabling the workpiece A to be moved to the desired position in the storage box B. As a result, the workpiece A can be smoothly placed in the storage box B while preventing, for example, the workpiece A from being unduly pressed against the peripheral object.

Second Embodiment

A second embodiment of the present invention will now be described. The present embodiment differs from the first embodiment only partly in the processing (specifically the processing in STEP7) carried out by a controller 10. Therefore, the description of the same aspects as those of the first embodiment will be omitted.

According to the present embodiment, in the processing in STEP7, the controller 10 calculates the likelihood of each candidate of a contact state according to expression (6) given below by using, for example, an evaluation function FE2 (↑x, ↑θ, ↑f) defined by expression (5) given below in place of the evaluation function FE1.

$$FE2(\uparrow x, \uparrow \theta, \uparrow f) = (R(\uparrow x, \uparrow \theta) \cdot \uparrow Fs - Gmat \cdot \uparrow f)^T \cdot D \quad (5)$$
$$1 \cdot (R(\uparrow x, \uparrow \theta) \cdot \uparrow Fs - Gmat \cdot \uparrow f)) +$$
$$(\uparrow xs - \uparrow x)^T \cdot D2 \cdot (\uparrow xs - \uparrow x) + (\uparrow \theta s - \uparrow \theta)^T \cdot D3 \cdot (\uparrow \theta s - \uparrow \theta))$$

$$\text{Likelihood} = \exp(-FE2(\uparrow xe, \uparrow \theta, \uparrow fe)) \quad (6)$$

In expression (5), ↑Fs and Gmat are the same as those in the foregoing expression (3). Further, ↑x denotes a vector that indicates the relative position of the workpiece A with respect to the distal end of an arm 3 of a manipulator 1, ↑θ denotes a vector that indicates the relative posture of the workpiece A with respect to the distal end of the arm 3 of the manipulator 1, R(↑x, ↑θ) denotes the coordinate transformation matrix determined on the basis of a set of the values of ↑x and ↑θ, ↑xs denotes a measurement value that includes an error of ↑x, ↑θs denotes a measurement value that includes an error of ↑θ, and D1, D2 and D3 denote weight matrices (diagonal matrices). As the relative position ↑x and the relative posture ↑θ of the workpiece A, the relative position and the relative posture of the workpiece A observed in, for example, the foregoing contact reaction force coordinate system may be adopted.

Further, ↑xe, ↑θe, and ↑fe in expression (6) constitute a set of the values of ↑x, ↑θ, and ↑f at which the value of the evaluation function FE2 (↑x, ↑θ, ↑f) of expression (5) becomes a minimum under the constrained condition represented by the inequality of the foregoing expression (2) related to each candidate of contact state, and FE2 (↑xe, ↑θe, ↑fe) denotes the value of the evaluation function FE2 (↑x, ↑θ, ↑f) when ↑x=↑xe and ↑θ=↑θe and ↑f=↑fe.

As the weight matrices D1, D2 and D3, identity matrices, for example, may be adopted. In this case, the right side of expression (4) will be the total sum of the square value of the vector (R(↑x, ↑θ)·↑Fs−Gmat·↑f), the square value of (↑xs−↑x), and the square value of (↑θs−↑θ).

Further, the coordinate transformation matrix R(↑x, ↑θ) is determined to become an identity matrix when ↑x and ↑θ coincide with a reference position and a reference posture, respectively, which are assumed when the feasible contact acting force range corresponding to each contact state is determined in advance.

The set of the values of ↑xe, ↑θe, and ↑fe can be calculated by a publicly known solution technique of a constrained nonlinear least squares problem.

The foregoing evaluation function FE2 (↑x, ↑θ, ↑f) is a function that denotes the total sum of the degrees of difference, namely, the degree of difference between the value of the contact acting force ↑F corresponding to a given value of the contact reaction force ↑f and the coordinate transformation value of the measurement value ↑Fs of the contact acting force R(↑x, ↑θ)·↑Fs (the first term of the right side of expression (5)) and the degree of difference between given values of the set of a relative position and a relative posture ↑x and ↑θ, respectively, of the workpiece A. and the set of the measurement values ↑xs and ↑θs (the second term and the third term of the right side of expression (5)). A smaller value of the function (a value being closer to zero) means a smaller total sum of the degrees of difference.

In other words, therefore, the set of ↑xe, ↑θe, and ↑fe is a set of values of ↑x, ↑θ, and ↑f at which the foregoing total sum of the degrees of difference becomes a minimum under the constrained condition of the foregoing expression (2) related to each candidate of contact state.

Calculating the likelihood of each candidate of contact state by using the foregoing evaluation function FE2 (↑x, ↑θ, ↑f) makes it possible to calculate the likelihood of each candidate by reflecting the variations in the actual position/posture (the degree of deviation from reference position/posture) of the workpiece A observed in the contact acting force coordinate system. This permits enhanced reliability of the likelihood and consequently enhanced reliability of the estimation result of the contact state of the workpiece A can be enhanced.

Supplementarily, the relationship of correspondence between the present embodiment and the present invention will be described. In the present embodiment, the evaluation function FE2 (↑x, ↑θ, ↑f) corresponds to the second evaluation function in the present invention, and FE2 (↑xe, ↑θe, ↑fe) corresponds to the evaluation index value in the present invention. Further, the processing for calculating the value of FE2 ((↑xe, ↑θe, ↑fe) in the processing in STEP7 corresponds to the processing carried out by the evaluation index value calculating unit in the present invention.

Other than the above, the relationship of correspondence between the present embodiment and the present invention is the same as that of the foregoing first embodiment.

Supplementarily, there may be a case where, after the feasible contact acting force range corresponding to each contact state is determined in advance, the desired values of the relative position/posture of the workpiece A (the set of the relative position and the relative posture with respect to the distal end of the arm 3 of the manipulator 1) for actually moving the workpiece A by the manipulator 1 are changed from the reference position/posture assumed at the time of determining the feasible contact acting force range. In such a case, the foregoing desired values (corresponding to the reference set values in the present invention) may be adopted as the values of ↑xs and ↑θs in the foregoing evaluation function FE2.

In this case, an additional step of preparing the feasible contact acting force range corresponding to each contact state again according to the updated desired values of the relative position/posture of the workpiece A can be omitted.

[Modifications]

A description will now be given of a few modifications related to the first embodiment and the second embodiment described above.

In the foregoing embodiments, the cases where the operation for placing the workpieces A in the storage box B is performed by the manipulator 1 have been described as the examples; however, the present invention is not limited to the operation. For example, the present invention can be applied also to a case where an operation for assembling any workpiece A to an object is performed by a manipulator.

Further, the manipulator 1 may be a manipulator that can be controlled by an operator in a master-slave mode. In this case, an operator will be notified of an estimated contact state, thus enabling the operator to adjust the movement path of a workpiece according to an actual contact state.

Further, in the foregoing STEP8, instead of using the likelihood, it may be determined whether the value of the evaluation function (FE1 (↑fe) or FE2 (↑xe, ↑θe, ↑fe)) calculated for the candidate corresponding to a unique specific range is smaller than the values of the evaluation functions (FE1 (↑fe) or FE2 (↑xe, ↑θe, ↑fe)) calculated for other candidates by a predetermined amount or more.

As the evaluation function FE1 according to the foregoing first embodiment, an evaluation function configured such that the function value thereof decreases as the degree of difference between ↑Fs and Gmat·↑f increases may be adopted. Similarly, as the evaluation function FE2 according to the foregoing second embodiment, an evaluation function configured such that the function value thereof decreases as the total sum of the degrees of difference, namely, the degree of difference between ↑Fs and Gmat·↑f and the degree of difference between the set of ↑xs, ↑θs and the set of ↑x, ↑θ, increases may be adopted.

Further, as the evaluation function FE1 according to the foregoing first embodiment, a function based on, for example, the absolute value of the difference between ↑Fs and Gmat·↑f may be adopted. Similarly, as the evaluation function FE2 according to the foregoing second embodiment, a function based on, for example, the total sum of the absolute value of the difference between ↑Fs and Gmat·↑f and the absolute values of the differences between ↑xs, ↑θs and ↑x, ↑θ may be adopted.

Further, in the case where the determination result in the foregoing STEP6 is affirmative, if, for example, the measurement value of a contact reaction force is relatively apart from the boundary of a unique specific range (i.e. a unique specific range extracted in STEP5), then a candidate corresponding to the unique specific range may be immediately estimated as an actual contact state.

Further, after the processing in STEP12 is carried out, the processing for determining whether the measurement value of a contact acting force has changed to a value that coincides or substantially coincides with a desired value determined in STEP10 may be carried out in addition to the determination processing in STEP5, and a candidate corresponding to the unique specific range can be estimated as an actual contact state if the determination results of both determination processings mentioned above or the determination result of one of the determination processings is affirmative.

Alternatively, after carrying out the processing in STEP12, processing for determining whether the measurement value of a contact acting force has changed to a value that coincides or substantially coincides with a desired value determined in STEP10 may be carried out in place of the determination processing in STEP5, and a candidate corresponding to the unique specific range can be estimated as an actual contact state if the determination result of the determination processing is affirmative.

To enhance the reliability of the estimation result of a contact state, the determination processing in STEP8 is desirably included.

What is claimed is:

1. A workpiece contact state estimating device adapted to estimate, at a time of performing an operation for moving a workpiece held by a distal end portion of a manipulator to a desired position by the manipulator, a state of contact of the workpiece with a peripheral object, which is an object existing in a periphery of the desired position, comprising a controller that includes a processor programmed to cause the controller to function as:

a measurement value acquiring unit that acquires a measurement value of a contact acting force, which is a force acting on the manipulator according to a contact reaction force applied to the workpiece from the peripheral object at a time of contact of the workpiece with the peripheral object; and an estimation processing unit that estimates, as an actual state of contact of the workpiece with the peripheral object, one of a plurality of types of contact states based on a feasible contact acting force range, which is a feasible range of a value of the contact acting force prepared in advance for each of the plurality of types of contact states determined in advance as feasible states of contact of the workpiece with the peripheral object, and the measurement value of the contact acting force, wherein the processor is further programmed to cause the estimation processing unit of the controller to function as:

a first determining unit that determines whether or not a measurement value of the contact acting force is a value that belongs only to the feasible contact acting force range corresponding to one contact state among the plurality of types of contact states, and to determine whether or not the one contact state is the actual contact state in a case where a determination result of the first determining unit is affirmative;

an evaluation index value calculating unit that uses a predetermined first evaluation function configured to indicate a degree of difference between a value of the contact acting force, which corresponds to any given value of the contact reaction force, and the measurement value for each of the plurality of types of contact states to determine a value of the contact reaction force at which the degree of difference becomes a minimum under a predetermined constrained condition that defines the range of a value of the feasible contact reaction force in each contact state and to determine an evaluation index value, which is a value of the first evaluation function corresponding to the determined value of the contact reaction force; and a second determining unit that determines whether or not the degree of difference indicated by the evaluation index value determined for one contact state is smaller than the degree of difference indicated by the evaluation index value determined for each contact state other than the one contact state, and the processor is further programmed to cause the estimation processing unit to estimate the one contact state as the actual contact state in a case where the determination result of the first determining unit is affirmative and a determination result of the second determining unit is affirmative.

2. The workpiece contact state estimating device according to claim 1, wherein the feasible contact acting force range for each of the plurality of types of contact states is a range defined by a relationship between a contact reaction force applied to the workpiece from the peripheral object and the contact acting force in each contact state, and a predetermined constrained condition that defines a range of a value of the feasible contact reaction force in each contact state, the predetermined constrained condition including at least one of a constrained condition related to a force of friction between the peripheral object and the workpiece and a constrained condition related to a direction of a drag acting on the workpiece from the peripheral object.

3. The workpiece contact state estimating device according to claim 1, wherein the processor is further programmed to cause the estimation processing unit to carry out processing for estimating the actual contact state from remaining contact states obtained by excluding the one contact state from the plurality of types of contact states in a case where the determination result of the second determining unit is negative.

4. A workpiece contact state estimating device adapted to estimate, at a time of performing an operation for moving a workpiece held by a distal end portion of a manipulator to a desired position by the manipulator, a state of contact of the workpiece with a peripheral object, which is an object existing in a periphery of the desired position, comprising a controller that includes a processor programmed to cause the controller to function as:

a measurement value acquiring unit that acquires a measurement value of a contact acting force, which is a force acting on the manipulator according to a contact reaction force applied to the workpiece from the peripheral object at a time of contact of the workpiece with the peripheral object; and an estimation processing unit that estimates, as an actual state of contact of the workpiece with the peripheral object, one of a plurality of types of contact states based on a feasible contact acting force range, which is a feasible range of a value of the contact acting force prepared in advance for each of the plurality of types of contact states determined in advance as feasible states of contact of the workpiece with the peripheral object, and the measurement value of the contact acting force, wherein the processor is further programmed to cause the estimation processing unit of the controller to function as:

a first determining unit that determines whether or not a measurement value of the contact acting force is a value that belongs only to the feasible contact acting force range corresponding to one contact state among the plurality of types of contact states, and to determine whether or not the one contact state is the actual contact state in a case where a determination result of the first determining unit is affirmative;

an evaluation index value calculating unit that uses a predetermined second evaluation function configured to indicate a degree of difference in total sum between a degree of difference between a value of the contact acting force, which corresponds to any given value of the contact reaction force, and the measurement value and a degree of difference between any given relative position/posture of the workpiece with respect to the distal end portion of the manipulator and a predetermined reference set value or a measurement value of the relative position/posture of the workpiece for each of the plurality of types of contact states, thereby to determine a set of the value of the contact reaction force and the value of the relative position/posture of the workpiece at which the degree of difference in total sum becomes a minimum under a predetermined constrained condition that defines a range of the value of a feasible contact reaction force in each contact state and also to determine an evaluation index value, which is a value of the second evaluation function corresponding to the determined set of the value of the contact reaction force and the value of the relative position/posture; and a second determining unit that determines whether or not the degree of difference in total sum indicated by the evaluation index value determined for the one contact state is smaller than the degree of difference in total sum indicated by the evaluation index values determined for each of the contact states other than the one contact state, and the processor is further programmed to cause the estimation processing unit to estimate the one contact state as the actual contact state in a case where the determination result of the first determining unit is affirmative and a determination result of the second determining unit is affirmative.

5. The workpiece contact state estimating device according to claim 4, wherein the processor is further programmed to cause the estimation processing unit to carry out processing for estimating the actual contact state from remaining contact states obtained by excluding the one contact state from the plurality of types of contact states in a case where the determination result of the second determining unit is negative.

6. A workpiece contact state estimating device adapted to estimate, at a time of performing an operation for moving a workpiece held by a distal end portion of a manipulator to a desired position by the manipulator, a state of contact of the workpiece with a peripheral object, which is an object existing in a periphery of the desired position, comprising a controller that includes a processor programmed to cause the controller to function as:
    a measurement value acquiring unit that acquires a measurement value of a contact acting force, which is a force acting on the manipulator according to a contact reaction force applied to the workpiece from the peripheral object at a time of contact of the workpiece with the peripheral object; and
    an estimation processing unit that estimates, as an actual state of contact of the workpiece with the peripheral object, one of a plurality of types of contact states based on a feasible contact acting force range, which is a feasible range of a value of the contact acting force prepared in advance for each of the plurality of types of contact states determined in advance as feasible states of contact of the workpiece with the peripheral object, and the measurement value of the contact acting force,
    wherein the processor is further programmed to cause the estimation processing unit of the controller to function as:
        a first determining unit that determines whether or not a measurement value of the contact acting force is a value that belongs only to the feasible contact acting force range corresponding to one contact state among the plurality of types of contact states, and to determine whether or not the one contact state is the actual contact state in a case where a determination result of the first determining unit is affirmative; and
        a manipulator control unit that operates, in a case where the determination result of the first determining unit is negative, the manipulator such that the measurement value of the contact acting force is changed toward a desired value determined to become a value that belongs only to a feasible contact reaction force range corresponding to any one contact state among the plurality of types of contact states, and a third determining unit that determines whether or not the measurement value of the contact acting force has been changed by the operation of the manipulator so as to be within the feasible contact acting force range to which the desired value belongs, and to estimate, as the actual contact state, a contact state corresponding to the feasible contact acting force range to which the desired value belongs in a case where a determination result of the third determining unit is affirmative.

7. The workpiece contact state estimating device according to claim 6,
    wherein the processor is further programmed to cause the estimation processing unit to carry out processing for estimating the actual contact state from remaining contact states obtained by excluding the one contact state from the plurality of types of contact states in a case where the determination result of the third determining unit is negative.

8. The workpiece contact state estimating device according to claim 6,
    wherein the processor is further programmed to cause the manipulator control unit to operate the manipulator such that the measurement value of the contact acting force is changed toward the desired value and then return the manipulator to a state before the operation.

9. A workpiece contact state estimation method, implemented using a controller that includes a processor programmed to cause the controller to function as a measurement value acquiring unit and an estimation processing unit which further includes a first determining unit, an evaluation index value calculating unit, and a second determining unit, for estimating, at a time of performing an operation for moving a workpiece held by a distal end portion of a manipulator to a desired position by the manipulator, a state of contact of a workpiece with a peripheral object, which is an object existing in a periphery of the desired position, the method comprising:
    a step of, using the measurement value acquiring unit, acquiring a measurement value of a contact acting force, which is a force acting on the manipulator based on a contact reaction force applied to the workpiece from the peripheral object at a time of contact of the workpiece with the peripheral object; and
    a step of, using the estimation processing unit, estimating, as an actual state of contact of the workpiece with the peripheral object, one contact state among a plurality of types of contact states based on a feasible contact acting force range, which is a feasible range of a value of the contact acting force prepared in advance for each of the plurality of types of contact states determined in advance as feasible states of contact of the workpiece with the peripheral object, and the measurement value of the contact acting force,
    wherein the step of estimating includes:
        a first determining step of, using the first determining unit, determining whether or not a measurement value of the contact acting force is a value that belongs only to the feasible contact acting force range corresponding to one contact state among the plurality of types of contact states, and determining whether or not the one contact state is the actual contact state in a case where a determination result of the first determining step is affirmative;
        an evaluation index value calculating step of, using the evaluation index value calculating unit, using a predetermined first evaluation function configured to indicate a degree of difference between a value of the contact acting force, which corresponds to any given value of the contact reaction force, and the measurement value for each of the plurality of types of contact states to determine a value of the contact reaction force at which the degree of difference becomes a minimum under a predetermined constrained condition that defines the range of a value of the feasible contact reaction force in each contact state and determining an evaluation index value, which is a value of the first evaluation function corresponding to the determined value of the contact reaction force;
        a second determining step of, using the first determining unit, determining whether or not the degree of difference indicated by the evaluation index value determined for one contact state is smaller than the degree of difference indicated by the evaluation index value determined for each contact state other than the one contact state; and
        a step of, using the estimation processing unit, estimating the one contact state as the actual contact state in a case where the determination result of the first determining step is affirmative and a determination result of the second determining step is affirmative.

* * * * *